US012660814B2

(12) United States Patent
Gupta et al.

(10) Patent No.: US 12,660,814 B2
(45) Date of Patent: Jun. 23, 2026

(54) CRYOGENIC STORAGE SYSTEM WITH SENSORS TO MEASURE ONE OR MORE PARAMETERS THEREWITHIN

(71) Applicant: TMRW Life Sciences, Inc., New York, NY (US)

(72) Inventors: Amit Gupta, Jersey City, NJ (US); Robert DeSanno, Maplewood, NJ (US); Alan Leroy Murray, New York, NY (US)

(73) Assignee: TMRW Life Sciences, Inc., New York, NY (US)

( * ) Notice: Subject to any disclaimer, the term of this patent is extended or adjusted under 35 U.S.C. 154(b) by 716 days.

(21) Appl. No.: 18/130,826

(22) Filed: Apr. 4, 2023

(65) Prior Publication Data

US 2023/0240285 A1      Aug. 3, 2023

Related U.S. Application Data

(63) Continuation of application No. 17/083,179, filed on Oct. 28, 2020, now Pat. No. 11,632,949.

(60) Provisional application No. 63/082,640, filed on Sep. 24, 2020.

(51) Int. Cl.
A01N 1/145      (2025.01)

(52) U.S. Cl.
CPC ...... A01N 1/145 (2025.01); F17C 2223/0161 (2013.01)

(58) Field of Classification Search
CPC .......... A01N 1/14; A01N 1/145; A01N 1/147; F17C 2223/0161; Y02E 60/32
See application file for complete search history.

(56) References Cited

U.S. PATENT DOCUMENTS

| | | |
|---|---|---|
| 4,573,581 A | 3/1986 | Galloway et al. |
| D300,583 S | 4/1989 | Smith |
| 4,944,162 A | 7/1990 | Lang et al. |

(Continued)

FOREIGN PATENT DOCUMENTS

| | | |
|---|---|---|
| AU | 2011357590 B2 | 9/2015 |
| AU | 2017287017 A1 | 1/2019 |

(Continued)

OTHER PUBLICATIONS

Chinese Notice of Allowance for Application No. 2023-541871 mailed Oct. 8, 2024, 3 pages.

(Continued)

*Primary Examiner* — John Kwon
(74) *Attorney, Agent, or Firm* — Cozen O'Connor

(57)      ABSTRACT

A system to store specimen containers in a temperature controlled environment includes at least a first temperature sensor positioned to sense a temperature in a first region of the temperature controlled environment in an interior of the cryogenic storage tank and at least a first level sensor positioned to sense a level of a cryogenic medium within the temperature controlled environment in the interior of the cryogenic storage tank. A method of storing specimen containers in a temperature controlled environment includes monitoring one or more parameters within the temperature controlled environment to prevent exposure of biological samples within the specimen containers to parameters that put the viability of the biological samples at risk.

20 Claims, 8 Drawing Sheets

(56) References Cited

U.S. PATENT DOCUMENTS

| | | | |
|---|---|---|---|
| D310,264 S | 8/1990 | Leoncavallo et al. |
| 5,024,830 A | 6/1991 | Linner |
| 5,176,202 A | 1/1993 | Richard |
| 5,233,844 A | 8/1993 | Knippscheer et al. |
| 5,355,684 A | 10/1994 | Guice |
| 5,545,562 A | 8/1996 | Cassou et al. |
| D382,809 S | 8/1997 | Aldrich et al. |
| D382,810 S | 8/1997 | Aldrich et al. |
| 5,711,446 A | 1/1998 | Jeffs et al. |
| 5,741,462 A | 4/1998 | Nova et al. |
| 5,751,629 A | 5/1998 | Nova et al. |
| 5,874,214 A | 2/1999 | Nova et al. |
| D408,145 S | 4/1999 | Au |
| 5,921,102 A | 7/1999 | Vago |
| 5,925,562 A | 7/1999 | Nova et al. |
| 5,964,095 A | 10/1999 | Coelho et al. |
| 6,066,300 A | 5/2000 | Carey et al. |
| 6,100,026 A | 8/2000 | Nova et al. |
| 6,141,975 A | 11/2000 | Tatsumi |
| 6,156,566 A | 12/2000 | Bryant |
| 6,302,327 B1 | 10/2001 | Coelho et al. |
| 6,329,139 B1 | 12/2001 | Nova et al. |
| 6,564,120 B1 | 5/2003 | Richard et al. |
| 6,701,743 B1 | 3/2004 | Durst et al. |
| D496,398 S | 9/2004 | Greenberg |
| 6,888,063 B1 | 5/2005 | Lien et al. |
| D506,550 S | 6/2005 | Greenberg |
| 7,070,053 B1 | 7/2006 | Abrams et al. |
| 7,091,864 B2 | 8/2006 | Veitch et al. |
| D535,478 S | 1/2007 | Uffner et al. |
| 7,228,198 B2 | 6/2007 | Volim et al. |
| 7,278,328 B2 | 10/2007 | Massaro |
| 7,316,896 B2 | 1/2008 | Kuwayama et al. |
| 7,350,703 B2 | 4/2008 | Ambartsoumian |
| 7,411,508 B2 | 8/2008 | Harazin et al. |
| D576,488 S | 9/2008 | Miota et al. |
| 7,661,591 B2 | 2/2010 | Dearing et al. |
| 7,694,886 B2 | 4/2010 | Tan et al. |
| 7,861,540 B2 | 1/2011 | Cloutier et al. |
| 7,870,748 B2 | 1/2011 | Byrne |
| D642,697 S | 8/2011 | Gaefvert |
| 8,097,199 B2 | 1/2012 | Abbott et al. |
| 8,098,162 B2 | 1/2012 | Abbott et al. |
| 8,115,599 B2 | 2/2012 | Harazin et al. |
| 8,168,138 B2 | 5/2012 | Che et al. |
| 8,378,827 B2 | 2/2013 | Davidowitz et al. |
| D682,045 S | 5/2013 | Myoung |
| 8,502,645 B2 | 8/2013 | Thomas et al. |
| 8,710,958 B2 | 4/2014 | Yang et al. |
| 8,790,597 B2 | 7/2014 | Childs et al. |
| 8,852,536 B2 | 10/2014 | Davidowitz et al. |
| 8,872,627 B2 | 10/2014 | Davidowitz |
| 8,884,743 B2 | 11/2014 | Chaffey et al. |
| 8,919,532 B2 | 12/2014 | Buergermeister et al. |
| 8,937,550 B2 | 1/2015 | Phaneuf et al. |
| 9,028,754 B2 | 5/2015 | Winter et al. |
| 9,033,251 B2 | 5/2015 | Weisshaupt et al. |
| D733,314 S | 6/2015 | Lui |
| 9,140,487 B2 | 9/2015 | Chaffey et al. |
| 9,163,869 B2 | 10/2015 | Warhurst et al. |
| 9,211,540 B2 | 12/2015 | Lansdowne |
| 9,280,738 B2 | 3/2016 | Dor et al. |
| 9,289,770 B2 | 3/2016 | Lavi |
| 9,297,499 B2 | 3/2016 | Jimenez-Rios et al. |
| 9,418,265 B2 | 8/2016 | Morris et al. |
| 9,431,692 B2 | 8/2016 | Davidowitz et al. |
| D768,868 S | 10/2016 | Inoue |
| D771,271 S | 11/2016 | Zingre |
| 9,501,734 B2 | 11/2016 | Morris |
| 9,516,876 B2 | 12/2016 | Inoue |
| D777,941 S | 1/2017 | Piramoon |
| 9,538,746 B2 | 1/2017 | Inoue |
| 9,538,747 B2 | 1/2017 | Inoue |
| 9,547,782 B2 | 1/2017 | Lansdowne |
| 9,551,649 B2 | 1/2017 | Houghton et al. |
| 9,589,225 B2 | 3/2017 | Morris |
| 9,619,678 B2 | 4/2017 | Morris et al. |
| 9,697,457 B2 | 7/2017 | Morris |
| 9,723,832 B2 | 8/2017 | Camenisch et al. |
| 9,736,890 B2 | 8/2017 | Chaffey et al. |
| 9,764,325 B2 | 9/2017 | Davidowitz |
| 9,796,574 B2 | 10/2017 | Frey et al. |
| 9,835,640 B2 | 12/2017 | Raicu et al. |
| 9,902,068 B1 | 2/2018 | Sestok et al. |
| 9,928,457 B2 | 3/2018 | Mcdowell |
| D816,165 S | 4/2018 | Haug |
| D835,472 S | 12/2018 | Seiders et al. |
| 10,156,386 B2 | 12/2018 | Bartlett et al. |
| D840,684 S | 2/2019 | Luburic |
| 10,207,270 B2 | 2/2019 | Lansdowne |
| 10,241,015 B2 | 3/2019 | Hollabaugh et al. |
| D845,139 S | 4/2019 | Wilson et al. |
| 10,328,431 B2 | 6/2019 | Davidowitz |
| 10,401,082 B2 | 9/2019 | Coradetti et al. |
| 10,493,457 B2 | 12/2019 | Croquette et al. |
| 10,531,657 B2 | 1/2020 | Farrington et al. |
| D874,875 S | 2/2020 | Huang |
| 10,561,141 B2 | 2/2020 | Suzuki et al. |
| 10,677,810 B2 | 6/2020 | Grimwood et al. |
| D890,948 S | 7/2020 | Figueredo et al. |
| 10,748,050 B2 | 8/2020 | Morris et al. |
| D910,836 S | 2/2021 | Sandberg et al. |
| 10,973,226 B2 | 4/2021 | Blair et al. |
| 10,989,636 B2 | 4/2021 | Gutelius et al. |
| D928,343 S | 8/2021 | Bonnoitt et al. |
| D930,186 S | 9/2021 | Kim |
| D931,128 S | 9/2021 | Li |
| D932,906 S | 10/2021 | Schulz |
| 11,148,143 B2 | 10/2021 | Davidowitz et al. |
| 11,175,298 B2 | 11/2021 | Neeper et al. |
| 11,186,421 B2 * | 11/2021 | Brothers ............ B65D 81/3806 |
| D938,053 S | 12/2021 | Xiao |
| D945,271 S | 3/2022 | Halgren et al. |
| 12,527,318 B2 * | 1/2026 | Craven ................. A01N 1/145 |
| 2002/0190845 A1 | 12/2002 | Moore |
| 2002/0196146 A1 | 12/2002 | Moore |
| 2003/0017082 A1 | 1/2003 | Van Deursen et al. |
| 2003/0174046 A1 | 9/2003 | Abrams |
| 2004/0100415 A1 | 5/2004 | Veitch et al. |
| 2004/0227617 A1 | 11/2004 | Vasquez et al. |
| 2004/0245329 A1 | 12/2004 | Huang |
| 2004/0265831 A1 | 12/2004 | Arav et al. |
| 2005/0058483 A1 | 3/2005 | Chapman et al. |
| 2005/0237195 A1 | 10/2005 | Urban |
| 2005/0247782 A1 | 11/2005 | Ambartsoumian |
| 2006/0051239 A1 | 3/2006 | Massaro |
| 2006/0283945 A1 | 12/2006 | Excoffier et al. |
| 2007/0034226 A1 | 2/2007 | Ferkel |
| 2007/0068208 A1 | 3/2007 | Norman et al. |
| 2007/0150375 A1 | 6/2007 | Yang |
| 2007/0172396 A1 | 7/2007 | Neeper et al. |
| 2007/0267419 A1 | 11/2007 | Fuhr et al. |
| 2008/0012687 A1 | 1/2008 | Rubinstein |
| 2008/0024301 A1 | 1/2008 | Fritchie et al. |
| 2008/0121700 A1 | 5/2008 | Dearing et al. |
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0153993 A1 | 6/2009 | Garcia et al. |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0141384 A1 | 6/2010 | Chen et al. |
| 2010/0281886 A1 | 11/2010 | Shaham et al. |
| 2010/0302040 A1 | 12/2010 | Davidowitz et al. |
| 2010/0318217 A1 | 12/2010 | Ferrer et al. |
| 2011/0088424 A1 | 4/2011 | Cloutier et al. |
| 2011/0088517 A1 | 4/2011 | Tsujimura et al. |
| 2011/0120148 A1 | 5/2011 | Yoshimura et al. |
| 2011/0137812 A1 | 6/2011 | Sherga |
| 2011/0143452 A1 | 6/2011 | Che et al. |
| 2011/0181875 A1 | 7/2011 | Nakahana et al. |

(56) References Cited

U.S. PATENT DOCUMENTS

| | | |
|---|---|---|
| 2011/0199187 A1 | 8/2011 | Davidowitz |
| 2011/0199188 A1 | 8/2011 | Dickson |
| 2011/0214243 A1 | 9/2011 | Major |
| 2011/0251982 A1 | 10/2011 | Dluhos et al. |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |
| 2012/0167786 A1 | 7/2012 | Laugharn, Jr. |
| 2012/0187197 A1 | 7/2012 | Masin |
| 2012/0212330 A1 | 8/2012 | Halberthal et al. |
| 2012/0256806 A1 | 10/2012 | Davidowitz et al. |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Laugharn et al. |
| 2013/0217107 A1 | 8/2013 | Pederson et al. |
| 2013/0236276 A1 | 9/2013 | Richter |
| 2013/0342320 A1 | 12/2013 | Hinman et al. |
| 2014/0008355 A1 | 1/2014 | Chaffey et al. |
| 2014/0081445 A1 | 3/2014 | Villamar |
| 2014/0157798 A1 | 6/2014 | Jimenez-Rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0295328 A1 | 10/2015 | Fireaizen |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0086003 A1 | 3/2016 | Nikitin |
| 2016/0095309 A1 | 4/2016 | Reuteler |
| 2016/0101908 A1 | 4/2016 | Minnette et al. |
| 2016/0143270 A1 | 5/2016 | Schryver |
| 2016/0175837 A1 | 6/2016 | Chaffey et al. |
| 2016/0232487 A1 | 8/2016 | Yonker |
| 2016/0236387 A1 | 8/2016 | Carroll et al. |
| 2016/0288999 A1 | 10/2016 | Caveney et al. |
| 2016/0289000 A1 | 10/2016 | Caveney et al. |
| 2016/0349172 A1 | 12/2016 | Houghton et al. |
| 2016/0353730 A1 | 12/2016 | Harston et al. |
| 2016/0358062 A1 | 12/2016 | Morris |
| 2016/0367188 A1 | 12/2016 | Malik et al. |
| 2017/0113909 A1 | 4/2017 | Frey et al. |
| 2017/0122846 A1 | 5/2017 | Holmes et al. |
| 2017/0146636 A1 | 5/2017 | Alicot et al. |
| 2017/0184479 A1 | 6/2017 | Schryver et al. |
| 2017/0190056 A1 | 7/2017 | Lapham et al. |
| 2017/0320054 A1 | 11/2017 | Crum et al. |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0086533 A1 | 3/2018 | Nelland |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |
| 2018/0154359 A1 | 6/2018 | Ueyama |
| 2018/0202908 A1 | 7/2018 | Croquette et al. |
| 2018/0272353 A1 | 9/2018 | Malin |
| 2018/0313498 A1 | 11/2018 | Antola et al. |
| 2018/0368394 A1 | 12/2018 | Nelland et al. |
| 2019/0000073 A1 | 1/2019 | Pedersen et al. |
| 2019/0005304 A1 | 1/2019 | Adalsteinsson et al. |
| 2019/0025280 A1 | 1/2019 | Kaditz et al. |
| 2019/0060892 A1 | 2/2019 | Davidowitz et al. |
| 2019/0092555 A1 | 3/2019 | Ma et al. |
| 2019/0162639 A1 | 5/2019 | Gutelius et al. |
| 2019/0193078 A1 | 6/2019 | Fiondella et al. |
| 2019/0215948 A1 | 7/2019 | Arnitz et al. |
| 2019/0250181 A1 | 8/2019 | Seeber |
| 2019/0276233 A1 | 9/2019 | Caveney et al. |
| 2019/0277868 A1 | 9/2019 | Privat De Fortune et al. |
| 2019/0293344 A1 | 9/2019 | Sun et al. |
| 2019/0297877 A1 | 10/2019 | Komatsu et al. |
| 2020/0093122 A1 | 3/2020 | Lin et al. |
| 2020/0097788 A1 | 3/2020 | Pedersen et al. |
| 2020/0107541 A1 | 4/2020 | Blair et al. |
| 2020/0143930 A1 | 5/2020 | Catchings et al. |
| 2020/0229429 A1 | 7/2020 | Blair et al. |
| 2020/0229431 A1 | 7/2020 | Blair et al. |
| 2020/0248638 A1 | 8/2020 | Engfehr et al. |
| 2020/0281191 A1 | 9/2020 | Ally et al. |
| 2020/0319625 A1 | 10/2020 | Morris et al. |
| 2020/0386649 A1* | 12/2020 | Baird, IV ............ G01M 3/3245 |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1* | 3/2022 | Gupta ...................... A01N 1/14 |
| 2022/0136656 A1 | 5/2022 | Clarke et al. |
| 2022/0221476 A1 | 7/2022 | Craven et al. |
| 2023/0329230 A1 | 10/2023 | Li et al. |
| 2024/0159433 A1* | 5/2024 | Brooks ................. F25D 29/001 |
| 2024/0428601 A1* | 12/2024 | Flores-Saiffe Farias .................... C12M 23/10 |

FOREIGN PATENT DOCUMENTS

| | | | |
|---|---|---|---|
| CA | 2972315 A1 | 8/2016 |
| CN | 102456118 A | 5/2012 |
| CN | 105857932 A | 8/2016 |
| CN | 105890965 A | 8/2016 |
| CN | 106102460 A | 11/2016 |
| CN | 205815766 U | 12/2016 |
| CN | 106370879 A | 2/2017 |
| CN | 106871546 A | 6/2017 |
| CN | 107624751 A | 1/2018 |
| CN | 108112576 A | 6/2018 |
| CN | 207595583 U | 7/2018 |
| CN | 207663251 U | 7/2018 |
| CN | 207675193 U | 7/2018 |
| CN | 108541702 A | 9/2018 |
| CN | 109258627 A | 1/2019 |
| CN | 208425434 U | 1/2019 |
| CN | 109922887 A | 6/2019 |
| CN | 110476952 A | 11/2019 |
| CN | 110517737 A | 11/2019 |
| CN | 209677194 U | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 210711515 U | 6/2020 |
| CN | 111357738 A | 7/2020 |
| CN | 111418578 A | 7/2020 |
| CN | 111771211 A | 10/2020 |
| CN | 112090469 A | 12/2020 |
| CN | 112189657 A | 1/2021 |
| CN | 112325976 A | 2/2021 |
| CN | 112325978 A | 2/2021 |
| CN | 112340334 A | 2/2021 |
| CN | 112841172 A | 5/2021 |

(56) References Cited

FOREIGN PATENT DOCUMENTS

| | | | |
|---|---|---|---|
| CN | 213274464 U | 5/2021 |
| CN | 112894791 A | 6/2021 |
| CN | 213863260 U | 8/2021 |
| CN | 213863569 U | 8/2021 |
| CN | 213872207 U | 8/2021 |
| CN | 213874569 U | 8/2021 |
| CN | 213995979 U | 8/2021 |
| CN | 214006820 U | 8/2021 |
| CN | 214216855 U | 9/2021 |
| CN | 214358041 U | 10/2021 |
| CN | 214398091 U | 10/2021 |
| CN | 214758843 U | 11/2021 |
| CN | 115352743 A | 11/2022 |
| CN | 219596677 U | 8/2023 |
| DE | 102011012887 A1 | 8/2012 |
| EP | 0411224 A2 | 2/1991 |
| EP | 0706825 A1 | 4/1996 |
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2301857 A1 | 3/2011 |
| EP | 2315163 A1 | 4/2011 |
| EP | 2358196 A1 | 8/2011 |
| EP | 2467465 A1 | 6/2012 |
| EP | 2124171 B1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2614320 B1 | 10/2016 |
| EP | 2354729 B1 | 12/2016 |
| EP | 2873497 B1 | 5/2017 |
| EP | 2948247 B1 | 11/2017 |
| EP | 3336456 A1 | 6/2018 |
| EP | 2743865 B1 | 6/2019 |
| EP | 2866938 B1 | 6/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3655892 A1 | 5/2020 |
| EP | 3228191 B1 | 8/2020 |
| EP | 4252009 A4 | 4/2024 |
| ES | 2467465 A2 | 6/2014 |
| ES | 2595984 T3 | 1/2017 |
| FR | 3095602 A1 | 11/2020 |
| JP | 2000137031 A | 5/2000 |
| JP | 2001142861 A | 5/2001 |
| JP | 2004028595 A | 1/2004 |
| JP | 2005009863 A | 1/2005 |
| JP | 2005239366 A | 9/2005 |
| JP | 2005321935 A | 11/2005 |
| JP | 2007235905 A | 9/2007 |
| JP | 2007532867 A | 11/2007 |
| JP | 2008021082 A | 1/2008 |
| JP | 2008522184 A | 6/2008 |
| JP | 2010521725 A | 6/2010 |
| JP | 2012526966 A | 11/2012 |
| JP | 5278978 B2 | 5/2013 |
| JP | 2014174647 A | 9/2014 |
| JP | 2015019244 A | 1/2015 |
| JP | 2015087306 A | 5/2015 |
| JP | 2017508984 A | 3/2017 |
| JP | 2017514499 A | 6/2017 |
| JP | 2017165487 A | 9/2017 |
| JP | 2018511782 A | 4/2018 |
| JP | 6343934 B2 | 6/2018 |
| JP | 2018136246 A | 8/2018 |
| JP | 2018529062 A | 10/2018 |
| JP | 2019505042 A | 2/2019 |
| JP | 2019518974 A | 7/2019 |
| JP | 2019529938 A | 10/2019 |
| JP | 2019536973 A | 12/2019 |
| JP | 2020079797 A | 5/2020 |
| KR | 20080070015 A | 7/2008 |
| KR | 102368093 B1 | 2/2022 |
| WO | 9216800 A1 | 10/1992 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |
| WO | 2006029110 A1 | 3/2006 |
| WO | 2007024540 A1 | 3/2007 |
| WO | 2007049039 A1 | 5/2007 |
| WO | 2007075253 A2 | 7/2007 |
| WO | 2007092119 A1 | 8/2007 |
| WO | 2008024471 A2 | 2/2008 |
| WO | 2008057150 A1 | 5/2008 |
| WO | 2009003231 A1 | 1/2009 |
| WO | 2009004366 A1 | 1/2009 |
| WO | 2009017558 A1 | 2/2009 |
| WO | 2009094071 A3 | 10/2009 |
| WO | 2009120596 A1 | 10/2009 |
| WO | 2009155638 A1 | 12/2009 |
| WO | 2010037166 A1 | 4/2010 |
| WO | 2011069190 A1 | 6/2011 |
| WO | 2012083396 A1 | 6/2012 |
| WO | 2012100281 A1 | 8/2012 |
| WO | 2012033605 A3 | 11/2012 |
| WO | 2012033994 A3 | 12/2012 |
| WO | 2012033992 A3 | 4/2013 |
| WO | 2013053011 A1 | 4/2013 |
| WO | 2010014656 A3 | 5/2013 |
| WO | 2012034037 A3 | 5/2013 |
| WO | 2014001819 A1 | 1/2014 |
| WO | 2014006417 A1 | 1/2014 |
| WO | 2014009729 A1 | 1/2014 |
| WO | 2014114938 A2 | 7/2014 |
| WO | 2014157798 A1 | 10/2014 |
| WO | 2014191757 A1 | 12/2014 |
| WO | 2015073964 A1 | 5/2015 |
| WO | 2015109315 A3 | 10/2015 |
| WO | 2016081755 A1 | 5/2016 |
| WO | 2016120224 A1 | 8/2016 |
| WO | 2016160984 A1 | 10/2016 |
| WO | 2016160986 A3 | 11/2016 |
| WO | 2016200519 A1 | 12/2016 |
| WO | 2017014999 A1 | 1/2017 |
| WO | 2017075144 A1 | 5/2017 |
| WO | 2017109153 A1 | 6/2017 |
| WO | 2017149468 A1 | 9/2017 |
| WO | 2017215957 A1 | 12/2017 |
| WO | 2018000051 A1 | 1/2018 |
| WO | 2018002287 A1 | 1/2018 |
| WO | 2018005129 A1 | 1/2018 |
| WO | 2018025053 A1 | 2/2018 |
| WO | 2018039727 A1 | 3/2018 |
| WO | 2018041516 A1 | 3/2018 |
| WO | 2018097267 A1 | 5/2018 |
| WO | 2018215588 A1 | 11/2018 |
| WO | 2019005450 A1 | 1/2019 |
| WO | 2019182900 A1 | 9/2019 |
| WO | 2020033578 A1 | 2/2020 |
| WO | 2020072945 A1 | 4/2020 |
| WO | 2021086983 A1 | 5/2021 |
| WO | 2022066943 A1 | 3/2022 |
| WO | 2022072646 A1 | 4/2022 |
| WO | 2022155225 A1 | 7/2022 |

OTHER PUBLICATIONS

Comiso, S. et al., "Biot cryocarrier-standardized cryogenic tempera-
ture handling of biospecimens"; Biopreservation and Biobanking

(56) References Cited

OTHER PUBLICATIONS 13.3: A15. Mary Ann Liebert Inc. (Jun. 2015) (Year: 2015).

Non Final Office Action for U.S. Appl. No. 18/487,878, mailed Sep. 16, 2024, 25 pages.

Thermo Fisher Scientific Introduces System to Double Cryogenic Storage Capacity; M2 Presswire Oct. 27, 2011: NA (Year: 2011).

Zachman, "High-Resolution Studies of Intact Solid-Liquid Interfaces and Reactive Materials by Cryogenic Electron Microscopy"; Cornell University. ProQuest Dissertations & Theses, 2018. 10845397. (Year: 2018).

"BioStore (TM) III Cryo" 2015, pp. 1-1, XP093203663, Internet Retrieved from the Internet: URL:https://corecryolab.com/wp-content/uploads/2016/04/Brooks-BioStore-III-Cryo-One-Pager-Automation.

"BioStoreTM III Automated LN2 Sample Storage Solutions", brookslifesciences.com. Mar. 17, 2020 (Mar. 17, 2020), pp. 1-6.

Notice of Allowance, mailed Feb. 14, 2025, for U.S. Appl. No. 18/113,297, 27 pages.

EP Search Report in EP App No. 22808100.6, mailed Mar. 6, 2025, 9 pages.

EP Search Report mailed Dec. 19, 2024, in European Patent Application No. 22879511.8, 8 pages.

European Patent Search Report mailed Sep. 27, 2024 in EP Application No. 21873453.1. in 6 pages.

European Search Report dated Sep. 20, 2024, for European Application No. 20955465.8 in 7 pages.

Extended European Search Report for European Application No. 21876482.7, dated Oct. 2, 2024, 7 pages.

EP Search Report mailed Nov. 7, 2023, in EP App No. 21808453.1, Nov. 11, 2023.

Japanese Office Action for Japanese Patent Application No. 2022-525678, mailed Oct. 12, 2023 (with English Translation) 12 pages.

Japanese Office Action for JP 2022-569516, mailed Nov. 8, 2023, 6 pages {with English Translation).

Japanese Office Action, dated Mar. 19, 2024, for corresponding Japanese Application No. 2023-519519, 15 pages.

Final Office Action Issued in U.S. Appl. No. 18/113,297, mailed Aug. 27, 2024, 54 pages.

Fontaine, "Automated Visual Tracking for Behavioral Analysis of Biological Model Organisms," Dissertation (Ph.D.), California Institute of Technology, ProQuest Dissertations Publishing (2008), 156 pages.

Notice of Allowance for U.S. Appl. No. 17/321,174, mailed Jul. 12, 2023, 13 pages.

"Secure Your Future with Cryofuture", Https://cryofuture.com, 2004, 13 pages.

"Your Partner for Local and Secure Cryostorage and Transportation", http://cryofuture.com, Clinic's workflow, 2024, 12 pages.

Australian Examination Report mailed Feb. 26, 2024, Application No. 2021348066, 8 pages.

Notice of Reasons for Refusal, Japanese Application No. 2023-541871, dated Apr. 24, 2024, 3 pages.

Non-Final Office Action Issued in U.S. Appl. No. 18/113,297, mailed May 14, 2024, 41 pages.

EP Search Report mailed Mar. 6, 2024 in EP App No. 22739992.0, 7 pages.

Notice of Allowance for U.S. Appl. No. 17/490,274, mailed Jun. 26, 2024, 13 pages.

Notice of Reasons for Refusal. Japanese Application No. 2023-518185, dated Jun. 17, 2024, 8 pages.

Canadian Office Action for Canadian Application No. 3,202,347, dated Nov. 7, 2024, 4 pages.

"Abeyance Web App / Stay Connected", Jul. 6, Abeyance Cry Solutions—Abeyateck, LLC, 2021, 3 pages.

"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.

"IVF Witness System: RI Witness TM ART Management System", CooperSurgical Fertility Company 2021, 24 pages.

"RI Witness—Confidence, Efficiency and Trust", CooperSurgical, Fertility and Genomic Solutions, Order No. WIT_BRO_001_V13_ROW—Oct. 13, 2020, 13 pages.

"RI Witness—Product guide", CooperSurgical Fertility and Genomic Solutions, Order No. EQU_BRO_004, V1:ROW Oct. 24, 2018, 12 pages.

"S840 Lab Mover", Large vol. LNS Dry Vapor Shipper, Products Shipping, Jul. 6, Abeyance Cry Solutions—Abeyateck, LLC, 2021, 3 pages.

"Simple, Secure—190°C LN2 Vapor Storage", Products Shipping, Jul. 6, Abeyance Cry Solutions—Abeyateck, LLC, 2021, 7 pages.

Brady printer Range, "Everyone is Unique" Continual cryopreservation monitoring from RI Witness, CooperSurgical, Inc. Order No. WIT_FLY_010_V2_US Oct. 14, 2020, 3 pages.

Comley, J., "New approaches to sample identification tracking and technologies for maintaining the quality of stored samples," Drug Discovery World Summer 2017, 11 pages.

Coopersurgical, RI Witness, Order No. CE 60010312 Version 3—ROW: Oct. 24, 2018, 12 pages.

Cryogenic Vials, Standard. Online, published date unknown. Retrieved on Dec. 8, 2021 from URL: https://www.nextdayscience.com/cryogenic-vials-standard.htm.

CX100 Cryo Express Dry Shipper With Shipping Case. Online, published date unknown. Retrieved on May 24, 2022 from URL:https://www.mitegen.com/product/cryo-express-dry-shipper-cx100-with-case, 2 pages.

Extended European Search Report dated Jun. 30, 2022, for European Application No. 19869478.8, 9 pages.

FluidX Tri-Coded Jacket: 0.7ml Sample Storage Tube with External Thread; Brooks Life Sciences; https://bioinventory.biostorage.com, 2019, 7 pages.

HID Beyond Cool: RFID disentangles cryopreservation storage and management, 2015, 4 pages.

Ihmig et al., "Frozen cells and bits," IEEE Pulse, Sep. 2013, 9 pages.

International Preliminary Report on Patentability and Written Opinion from PCT Application No. PCT/GB2005/002048 dated Aug. 23, 2005, 9 pages.

International Search Report and Written Opinion for International Application No. PCT/US2020/057779, Mailed on Jun. 17, 2021, 12 pages.

International Search Report and Written Opinion for PCT/US2020/057764, Mailed Date: Feb. 19, 2021, 14 pages.

International Search Report and Written Opinion for PCT/US2020/060565, mailed Mar. 8, 2021, 11 pages.

International Search Report and Written Opinion for PCT/US2021/051803, mailed Jan. 12, 2022, 6 pages.

International Search Report and Written Opinion for PCT/US2021/062676, mailed Apr. 1, 2022, 9 pages.

International Search Report and Written Opinion for PCT/US2021/063608, mailed Apr. 12, 2022, 11 pages.

International Search Report and Written Opinion for PCT/US2022/012151, mailed Apr. 29, 2022, 9 pages.

International Search Report and Written Opinion for PCT/US2022/028185, mailed Aug. 26, 2022, 11 pages.

International Search Report and Written Opinion for PCT/US2022/077741, mailed date Feb. 1, 2023, 12 pages.

International Search Report for PCT/US2021/032600, mailed Sep. 3, 2021, 4 pages.

Japanese Office Action for Japanese Patent Application No. 2022-525678, mailed May 29, 2023 (with English Translation) 12 pages.

Japanese Office Action, dated Jun. 6, 2023, for corresponding Japanese Application No. 2022-525679, 16 pages.

Non Final Office Action for U.S. Appl. No. 17/083,179, mailed Sep. 1, 2022, 8 pages.

Non Final Office Action for U.S. Appl. No. 17/321,174, mailed Nov. 22, 2022, 26 pages.

Non-Final Office Action Issued in U.S. Appl. No. 16/840,270, Mailed Sep. 21, 2021, 58 pages.

Notice of Allowance mailed Jan. 4, 2022, for "Cryogenic Vial", U.S. Appl. No. 29/748,815, 9 pages.

Notice of Reasons for Refusal for Japanese Patent Application No. 2021-518707, mailed May 11, 2022, 11 pages.

(56) References Cited

OTHER PUBLICATIONS

Notice of Reasons for Rejection, issued in corresponding Japanese Application No. 2021-518707, dated May 11, 2022, 5 pages.

Office Action dated Sep. 3, 2020, for U.S. Appl. No. 16/840,718, 46 pages.

OXO Airtight Pet Food Storage POP Container. Online published date unknown. Retrieved on May 24, 2022 from URL: https://www.walmart.com/ip/oxo-pet-food-storage-pop-container/623284606, 1 page.

Maggiulli, Roberta , et al., "Implementing an electronic witnessing system into a busy IVF clinic—one clinic's experience", Genera Center for Reproductive Medicine, Rome, Italy, 2 pages.

Rienzi, Laura , et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.

Swedberg, Claire , "Hitachi Chemical Markets Tiny UHF Tag", https://www.rfidjournal.com/hitachi-chemical-markets-tiny-uhf-tag, Sep. 12, 2010, 4 pages.

Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.

Non Final Office Action for U.S. Appl. No. 17/738,981, mailed Apr. 23, 2025, 29 pages.

Notice of Allowance for U.S. Appl. No. 17/961,983 mailed Sep. 26, 2025, 9 pages.

* cited by examiner

CRYOGENIC STORAGE SYSTEM WITH SENSORS TO MEASURE ONE OR MORE PARAMETERS THEREWITHIN

TECHNICAL FIELD

The present disclosure generally relates to apparatus and methods to store specimen containers in a temperature controlled environment, and to monitor one or more parameters within the temperature controlled environment to prevent exposure of biological samples within the specimen containers to parameters that put the viability of the biological samples at risk.

BACKGROUND

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological specimen or sample (for example, an oocyte, an embryo, a biopsy) contained in or on a storage device (for example, a cryopreservation straw, cryopreservation tube, stick or spatula) is rapidly cooled by placing the biological specimen and the storage device in a substance, such as liquid nitrogen. This results in a glass-like solidification or glassy state of the biological specimen (for example, a glass structure at the molecular level), which maintains the absence of intracellular and extracellular ice (for example, reducing cell damage and/or death) and, upon thawing, improves post-thaw cell viability. To ensure viability, the vitrified biological specimens must then be continuously stored in a liquid nitrogen dewar or other container containing the liquid nitrogen, which is at a temperature of negative 190 degrees Celsius.

There are, however, a number of concerns in how these biological specimens are being stored, identified, managed, inventoried, retrieved, etc.

For example, each harvested embryo is loaded on a rigid specimen holder (for example, embryo straw, stick or spatula). In the case of a tubular specimen holder, the tube may be closed (for example, plugged) at one end and open at the other end. The cryopreservation storage devices (for example, specimen holders) containing or holding the embryos are cooled as quickly as possible by plunging the cryopreservation storage device with the biological material into a liquid nitrogen bath in a cryogenic freezer at a temperature of approximately negative 190 degrees Celsius, for example to achieve vitrification. More particularly, multiple cryopreservation storage devices are placed in a goblet for placement in the liquid nitrogen storage tank or freezer. The goblet attaches to the liquid nitrogen storage tank such that the multiple cryopreservation storage devices are suspended in the liquid nitrogen. Labels that are manually written-on using a suitable marker pen or printed using a custom printer are attached to the straw and/or the goblet. Such labels can include identification information corresponding to the individual that the embryo was harvested from and other suitable information (for example, a cryopreservation storage device number, a practitioner number, etc.).

Access to the biological specimens are required during normal operation. For example, a particular biological specimen or specimens may be required to perform a procedure (for example, implantation of a fertilized egg). Retrieval of cryopreservation storage devices and associated biological specimens from the cryogenic refrigerator or cryogenic tank in which the biological specimens are stored exposes the retrieved biological specimens to non-cryogenic conditions (for example, temperatures above negative 190° C., and depending on a duration of the exposure places the biological specimens at risk. Due to the way biological specimens are stored (for example, cryopreservation storage devices arrayed in cassettes, cassettes arrayed in stacks), retrieval of one or more desired biological specimens often requires retrieval of additional biological specimens that are not needed at that time, exposing such to risk. Additionally, transport of biological specimens from a cryogenic refrigerator to a site of an intended use (for example, fertilization, implantation) exposes the biological specimens to risk.

With regard to storage and management of these biological specimens, facilities employ personnel that are required to maintain the liquid nitrogen storage tanks (for example, by refilling them with liquid nitrogen when needed) and manage the inventory of stored biological specimens (for example, by performing periodic accountings). There is, however, little recordkeeping with regard to the proper storage of these biological specimens. For example, subsequent identification or otherwise handling of the vitrified biological specimen or sample can involve removal of the specimen from temperature-controlled storage and exposure of the sample to ambient temperature, thus potentially risking the viability of the sample.

BRIEF SUMMARY

Accordingly, it is desirable to provide new apparatus and methods for transferring biological specimens (for example, eggs, sperm, embryos) to and from a temperature controlled environment, and storage of the biological specimens within the temperature controlled environment. It is also desirable to provide new apparatus and methods to validate that the stored biological specimens were maintained at proper conditions (for example below a certain temperature) throughout the storage and retrieval process while maintaining records of the conditions for each of the stored biological specimens.

A cryogenic storage system to store specimen containers in a temperature controlled environment includes a cryogenic storage tank. The cryogenic storage tank includes at least one wall that forms an interior of the cryogenic storage tank and that thermally insulates the interior of the cryogenic storage tank from an exterior thereof to provide the temperature controlled environment. The cryogenic storage tank includes an opening that provides ingress into and egress out of the temperature controlled environment. The cryogenic storage system further includes at least a first temperature sensor positioned to sense a temperature in a first region of the temperature controlled environment in the interior of the cryogenic storage tank. The cryogenic storage system further includes at least a first level sensor positioned to sense a level of a cryogenic medium within the temperature controlled environment in the interior of the cryogenic storage tank.

According to one embodiment, the first region of the cryogenic storage system includes an upper region of the temperature controlled environment and the first temperature sensor is positioned to sense the temperature in the upper region of the temperature controlled environment. The cryogenic storage system further includes a second temperature sensor positioned to sense a temperature in a second region of the temperature controlled environment in the interior of the cryogenic storage tank, wherein the second region is a lower region of the temperature controlled environment, and the lower region spaced relatively below the upper region of the temperature controlled environment.

According to one embodiment, the at least a first temperature sensor and the at least a first level sensor each measure conditions in the interior of the cryogenic storage tank. The cryogenic storage system, in response to the measured conditions crossing a certain threshold, produces notifications or alerts prompting corrective action to restore the conditions to acceptable values by recrossing the certain threshold.

According to one embodiment, the cryogenic storage system creates a record for each of the specimen containers stored within the temperature controlled environment. The record includes one or more conditions associated with each of the respective specimen containers. The one or more conditions includes a temperature of a region within the interior of the temperature controlled environment over a period of time in which the respective specimen container was positioned within the region. The one or more conditions includes removal of the respective specimen container from the temperature controlled environment and the length of time from removal to re-entry of the respective specimen container back into the temperature controlled environment.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
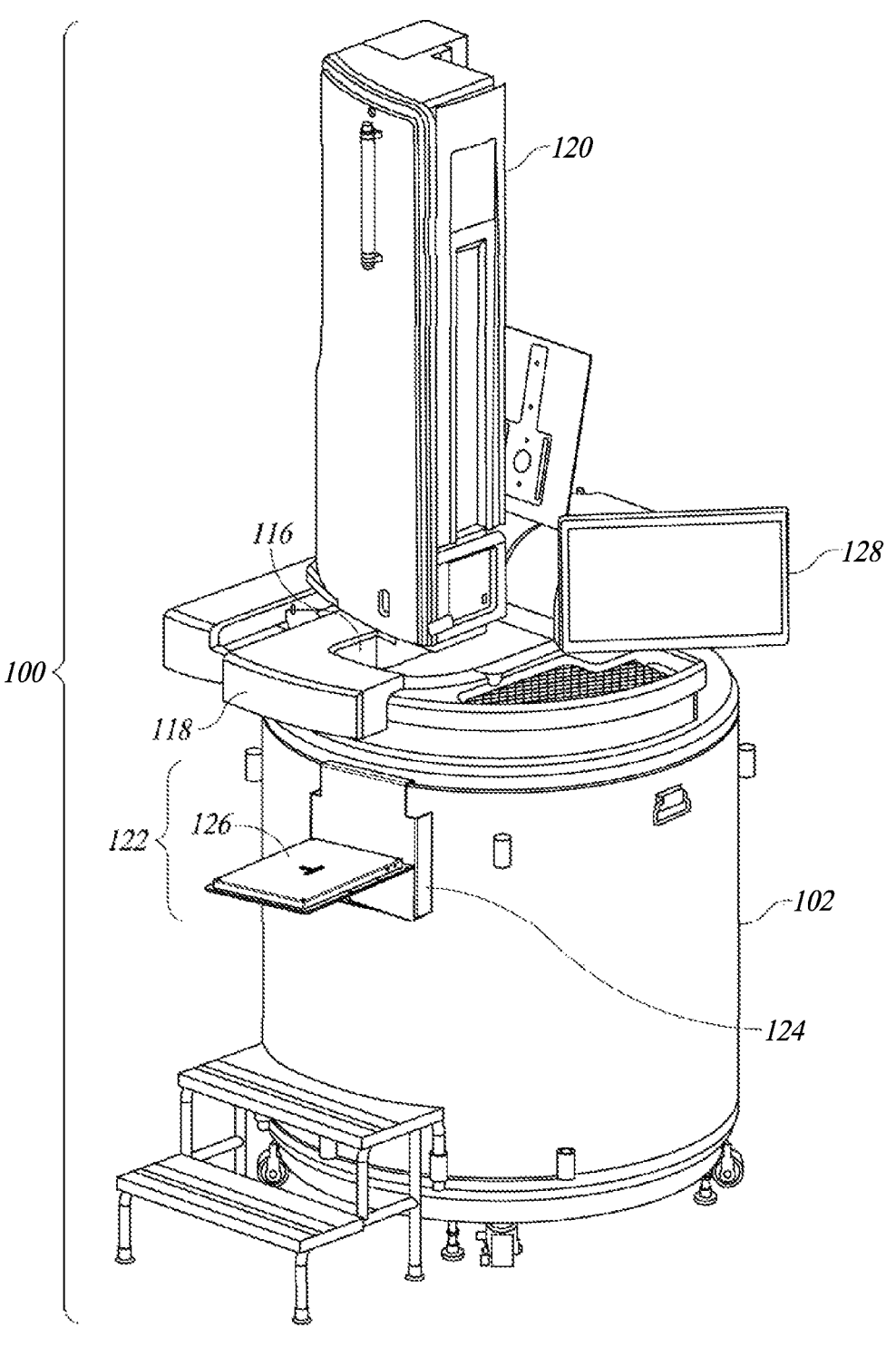
FIG. 1 is an isometric view of a cryogenic storage system, according to at least one implementation, the cryogenic storage system including or interfacing with a transfer system to facilitate transfer of biological specimens (for example, eggs, sperm, embryos) between a cryogenic freezer or storage tank that holds a liquid nitrogen bath and a portable thermally insulated carrier, and/or to facilitate identification of stored biological specimens and evidence chain-of-custody during handling.

FIG. 1 shows a cryogenic storage system 100, according to at least one illustrated embodiment. The cryogenic storage system 100 may take one of a large variety of forms, typically including a cryogenic storage tank or freezer 102, which can store a number of containers in a cryogenic environment, for example immersed in a bath of liquid nitrogen at a temperature at or below about negative 190° C. The cryogenic storage tank or freezer 102 may be highly thermally insulated, and may, for example, include stainless steel interior and exterior walls with a vacuum and/or other thermal insulating material therebetween.

Figure 2:
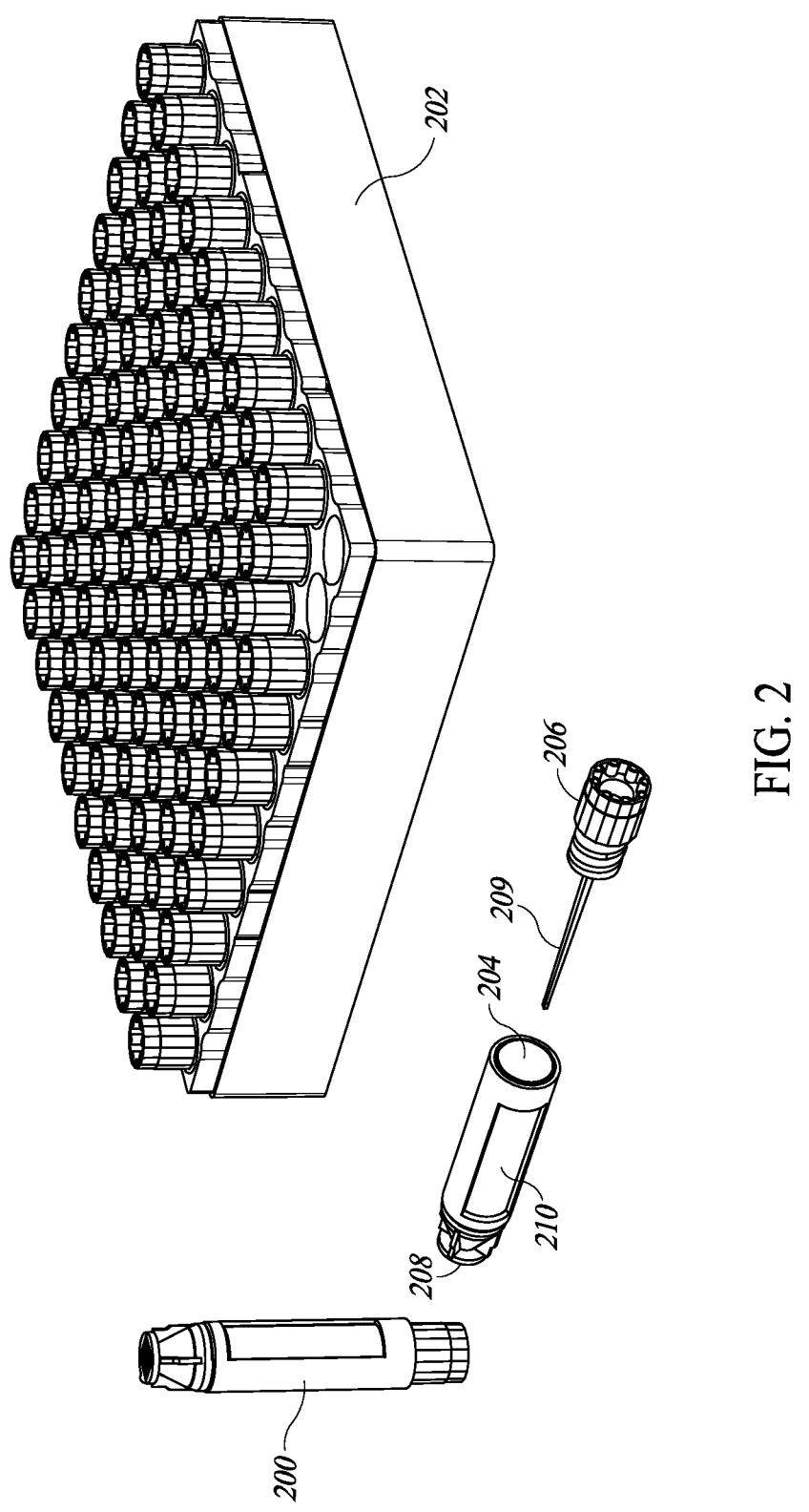
FIG. 2 is an isometric view of a storage cassette holding a plurality of specimen containers, with two of the specimen containers removed from the storage cassette to better illustrate aspects of those storage containers.
Figure 3:
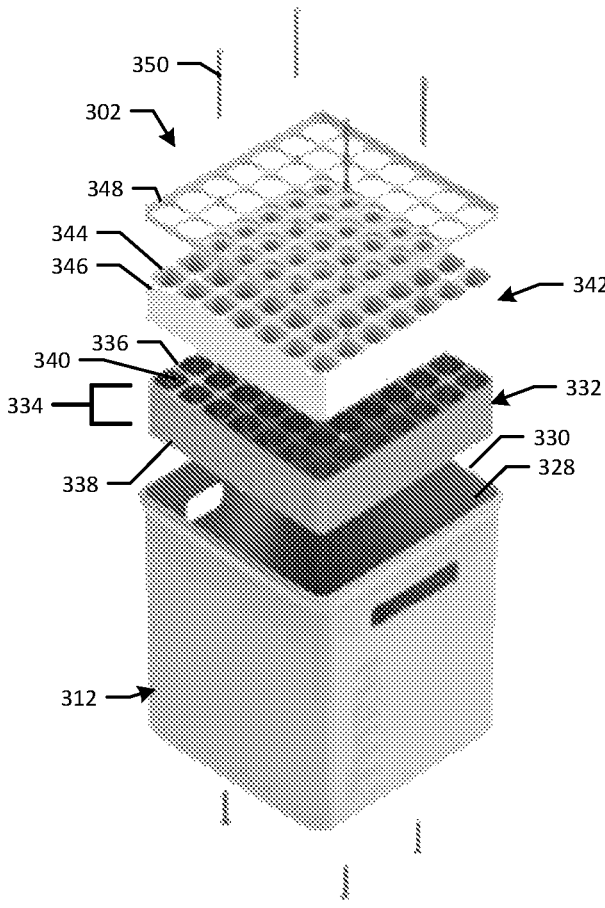
FIG. 3 is an isometric view of a storage cassette, according to another implementation.

As illustrated in FIGS. 2 and 3, the containers stored by the cryogenic storage tank or freezer 102 are formed as specimen containers 200 (only one called out). These specimen containers 200 may be stored in storage cassettes 202 or storage cassettes 302 for long term storage via a cryogenic refrigerator, such as the cryogenic storage tank or freezer 102. Each specimen container 200 may include a vial 204 (only one called out), a cap 206 (only one called out), one or more wireless transponders (for example, radio frequency identification (RFID) transponders) 208 (only one called out), an elongated specimen holder 209 (for example, straw, rod, spatula), one or more machine-readable symbols 210 (only one called out), or any combination thereof.

The specimen containers 200 may be sized to store specimens of biological tissue, for instance eggs, sperm or embryos, for example on the elongated specimen holder 209. Various implementations of specimen containers are described in U.S. patent application 63/026,526, filed May 18, 2020; U.S. patent application 62/936,133, filed Nov. 15, 2019; U.S. patent application 62/927,566, filed Oct. 29, 2019; U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018.

The specimen containers 200 are typically arrayed in the storage cassette 202, 302 for example arrayed in a two-dimensional array (for example, 7 by 7, 10 by 10, 8 by 12, 14 by 14). The storage cassettes 202, 302 are typically stored in the cryogenic storage tank or freezer 102 in vertical stacks, the vertical stacks also called racks. The stacks or racks of storage cassettes 202, 302 may be annularly arrayed in the cryogenic storage tank or freezer 102 about a central axis of the cryogenic storage tank or freezer 102. The cryogenic storage tank or freezer 102 may include a turntable or convey in the interior thereof, on which the stacks or racks of storage cassettes 202, 302 are carried. This allows respective stacks or racks of storage cassettes 202 to be aligned with an opening 116 of the cryogenic refrigerator for placement or removal.

The storage cassette 302 maintains cryogenic conditions for an array of the specimen containers 200, for example 49 separate ones of the specimen containers 200, according to at least one implementation. As shown in the illustrated embodiment, the storage cassette 302 may include a bulk container 312 that delineates an interior compartment 328. The interior compartment 328 may have an interior compartment profile, and the bulk container 312 may have an opening 330 at the top thereof.

The storage cassette 302 may further include a thermal shunt 332 with a substrate 334. According to one embodiment, the substrate 334 includes a metal. As shown, the substrate 334 may include a first major face 336 and a second major face 338, the second major face 338 opposed from the first major face 336 across a thickness of the substrate 334. The substrate 334 may have an array of a plurality of through holes 340 that extend through the thickness of the substrate 334. Each of the through holes 340 of the substrate 334 may be shaped and sized to receive at least a portion of the specimen containers 200.

As shown, the substrate 334 may be closely receivable in the interior compartment 328 of the bulk container 312. The thermal shunt 332 may have an outer profile that is asymmetrical to ensure that the thermal shunt 332 is positioned correctly in the interior compartment 328 of the bulk container 312. The thermal shunt 332 may be made of any of a variety of materials, preferably having a relatively large thermal mass as compared to the materials to be stored in the storage cassette 302. Suitable materials for the thermal shunt 332 may include, for example, slabs of non-ferrous metals, or metal impregnated polymers where the metal is a non-ferrous metal or the metal is in the form of small pieces, particles or strands that are sufficiently small and discontinuous as to prevent or retard the formation of currents therethrough. In at least some implementations, the thermal shunt 332 takes the form of an aluminum plate, slab, or slug.

The storage cassette 302 may further include a thermally insulative material 342 closely receivable in the interior compartment 328 of the bulk container 312, the thermally insulative material 342 may have an array of a plurality of through holes 344 that extend there through. The thermally insulative material 342 reduces heat transfer (via conduction, convection, or both) outward from the thermal shunt 332 toward an external environment of the storage cassette 302.

According to one embodiment, each of the through holes 344 of the thermally insulative material 342 may be shaped and sized to receive at least a portion of the specimen containers 200. According to one embodiment, the thermally insulative material 342 may include a first portion 346 and a second portion 348. As shown the first portion 346 and the second portion 348 may be securable to one another, for example with one or more fasteners 350.

The thermally insulative material 342 and the thermal shunt 332 may be stacked in the interior compartment 328 of the bulk container 312 such that each of the through holes 344 of the thermally insulative material 342 is axially aligned with a respective one of the through holes 340 of the thermal shunt 332. The through holes 340 and 344 may have matching shapes, or alternatively, the through holes 340 may have a shape that is different from that of the through holes 344. The through holes 340, the through holes 344, or both the through holes 340 and 344 may be circular. The through holes 340, the through holes 344, or both the through holes 340 and 344 may be square with rounded corners.

Returning to FIG. 1, the cryogenic storage tank or freezer 102 includes an opening 116 and a door or cover 118 to selectively open and close the opening 116, to respectively provide access to the interior of the cryogenic storage tank or freezer 102 from an exterior thereof, and to prevent access, as well as hermetically seal the interior from the exterior to maintain the cryogenic temperature in the interior of the cryogenic storage tank or freezer 102. The stacks or racks of storage cassettes 202, 302 may be selectively placed into the interior of the cryogenic storage tank or freezer 102 for storage at cryogenic temperatures and removed from the interior of the cryogenic storage tank or freezer 102 for use via the opening 116.

According to one embodiment, the cryogenic storage tank or freezer 102 may include one or more insulated sleeves deployable to surround the one or more of the stacks or racks of storage cassettes 202, 302. The one or more insulated sleeves may be deployed when the stacks or racks of storage cassettes 202, 302 are being handled or accessed for insertion and removal from the cryogenic storage tank or freezer 102. For example is one of the storage cassettes 202, 302 in a first rack is being handled, insulated sleeves may be deployed to surround the other racks.

According to one embodiment, the cryogenic storage tank or freezer 102 may include one or more breakaway or removable panels. Thus, in the event of a failure, (for example, a power outage) the inside of the temperature controlled environment 17 may be accessed quickly to facilitate removal of the storage cassettes 20 enabling the storage cassettes 20 to be quickly placed in another temperature controlled environment. According to one embodiment, at least a portion of the cryogenic storage tank or freezer 102 may be transparent so as to enable vision of the storage cassettes 20 within the temperature controlled environment 17 from outside the temperature controlled environment 17.

In some implementations, the stacks or racks of storage cassettes 202, 302 are manually removed from the cryogenic storage tank or freezer 102 when needed, and manually placed in the cryogenic storage tank or freezer 102 to store the specimens in the specimen containers 200 at cryogenic temperatures. In other implementations, the cryogenic storage system 100 includes a picker or elevator 120 to automatically remove selected ones of the stacks or racks of storage cassettes 202, 302 from the cryogenic storage tank or freezer 102 when needed, and to automatically place the storage cassettes 202, 302 with the specimen containers 200 in the cryogenic storage tank or freezer 102 to store the specimens in the specimen containers 200 at cryogenic temperatures.

The storage and retrieval mechanism (for example, turntable, picker or elevator) of the cryogenic storage tank or freezer 102 can automatically replicate movements of a human, and hence is denominated as a robot or robotic system. Whether manually moved or automatically moved, it is typically important to minimize exposure of the specimens to temperatures higher than about negative 190° C. (for example, ambient room temperature or about 23° C.).

A transfer system 122 may facilitate a transfer of specimen containers 200 from the storage cassettes 202 to carrier cassettes and/or to portable thermally insulated cryogenic carriers in which the carrier cassettes are carried. The transfer system 122 may be part of the cryogenic storage system 100, or may be provided as a separate system that interfaces with the cryogenic storage system 100. For example, the transfer system 122 may interface with a conventional commercially available cryogenic automated storage system (for example, the Bistore III Cryo −190° C. System sold by Brooks Life Sciences)).

The transfer system 122 includes one or more readers 124 (only one shown in FIG. 1) operable to read information from one or more wireless transponders physically associated with respective specimen containers 200, storage cassettes 202, and/or carrier cassettes 302 (FIG. 3). As explained in detail herein, the readers 124 may include one or more antennas, for example a two-dimensional array of antennas 126, and one or more transmitters, receivers, transceivers (collectively radios), operable to cause the antennas to emit interrogation signals and to receive response signals in response to the interrogations signals. The reader(s) 124 may take the form of an RFID reader or interrogator. The transfer system 122 may include one or more dedicated user interface components (for example, touch screen display, speakers, microphones), or may employ a user interface component of the cryogenic storage system 100, for example one or more touch screen displays 128.

Portions of the cryogenic system 100 may be of a conventional design. For example, the cryogenic storage tank or freezer and/or the picker or elevator may take the form of a commercially available automated storage system (for example, the Bistore III Cryo −190° C. System sold by Brooks Life Sciences). Some, or even all, of the cryogenic system 100 may include structures and methods for described herein, and thus are not known by the applicant to be either conventional or commercially available. For example, the transfer system 122 including the reader 124 is operable to work with a portable thermally insulated cryogenic carrier 400 (FIG. 4, described below), and to facilitate transfer of the specimen containers 200 between the storage cassette 202, 302 and a portable carrier.

Figure 4:
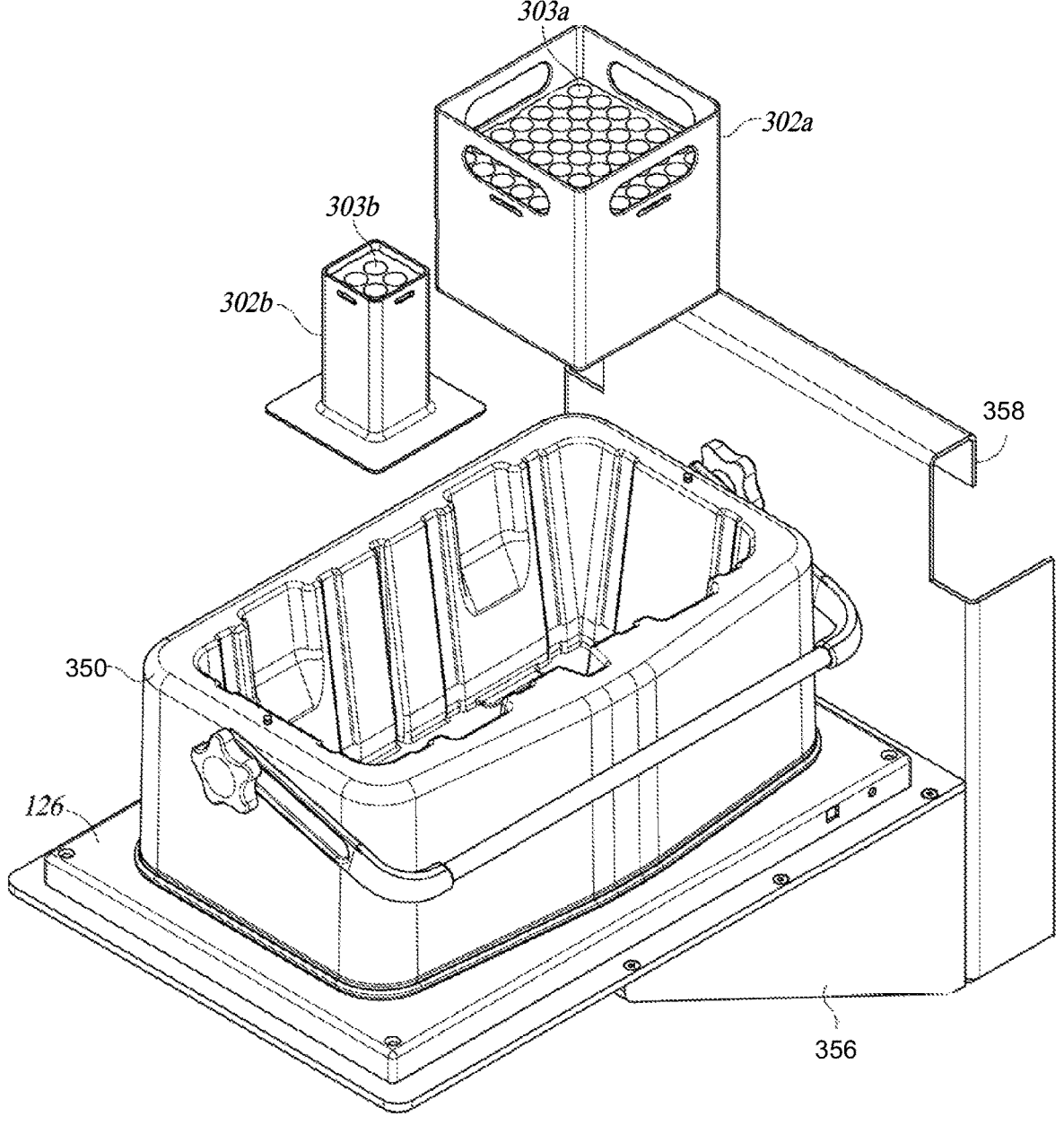
FIG. 4 is an isometric view of a portable thermally insulated cryogenic carrier that carries or holds a number of carrier cassettes positioned with respect to an antenna array of a reader of a transfer system, according to at least one implementation.

FIG. 4 shows a portable thermally insulated cryogenic carrier 350 that carries or holds a number of the carrier cassettes 202, 302a, 302b (a smaller version of the storage cassette 302 described above) positioned with respect to an antenna array 126 of the reader 124 of the transfer system 122, according to at least one illustrated implementation.

The portable thermally insulated cryogenic carrier 350 is shown without a cover, and with the carrier cassettes 302a, 302b removed to better illustrate various features. In use, the portable thermally insulated cryogenic carrier 300 may hold a liquid nitrogen bath in the interior thereof, and the carrier cassettes 302a, 302b may be positioned at least partially immersed in the liquid nitrogen bath in the interior of the portable thermally insulated cryogenic carrier 350, with a cover positioned to close the opening at the top of the portable thermally insulated cryogenic carrier 350.

The antenna array 126 and/or the reader 124 may be supported by a platform or frame 356. The platform or frame 356 may have a lip 358 that allows the platform or frame 356 to be hung from a structure (for example, edge, handle) of the cryogenic storage tank or freezer 102, advantageously allowing the antenna array 126 and/or the reader 124 to be positioned proximate the cryogenic storage tank or freezer 102 to facilitate transfers between. This also advantageously allows simplified retrofit of the processor-based transfer system 122 to the cryogenic storage tank or freezer 102. Alternatively or additionally, the platform or frame 356 may be secured to the cryogenic storage tank or freezer 102 via other structures, for example fastened there to via fasteners (for example, bolts, screws, rivets), adhered thereto by adhesive or epoxy, or soldered thereto via a solder joint.

Figure 5:
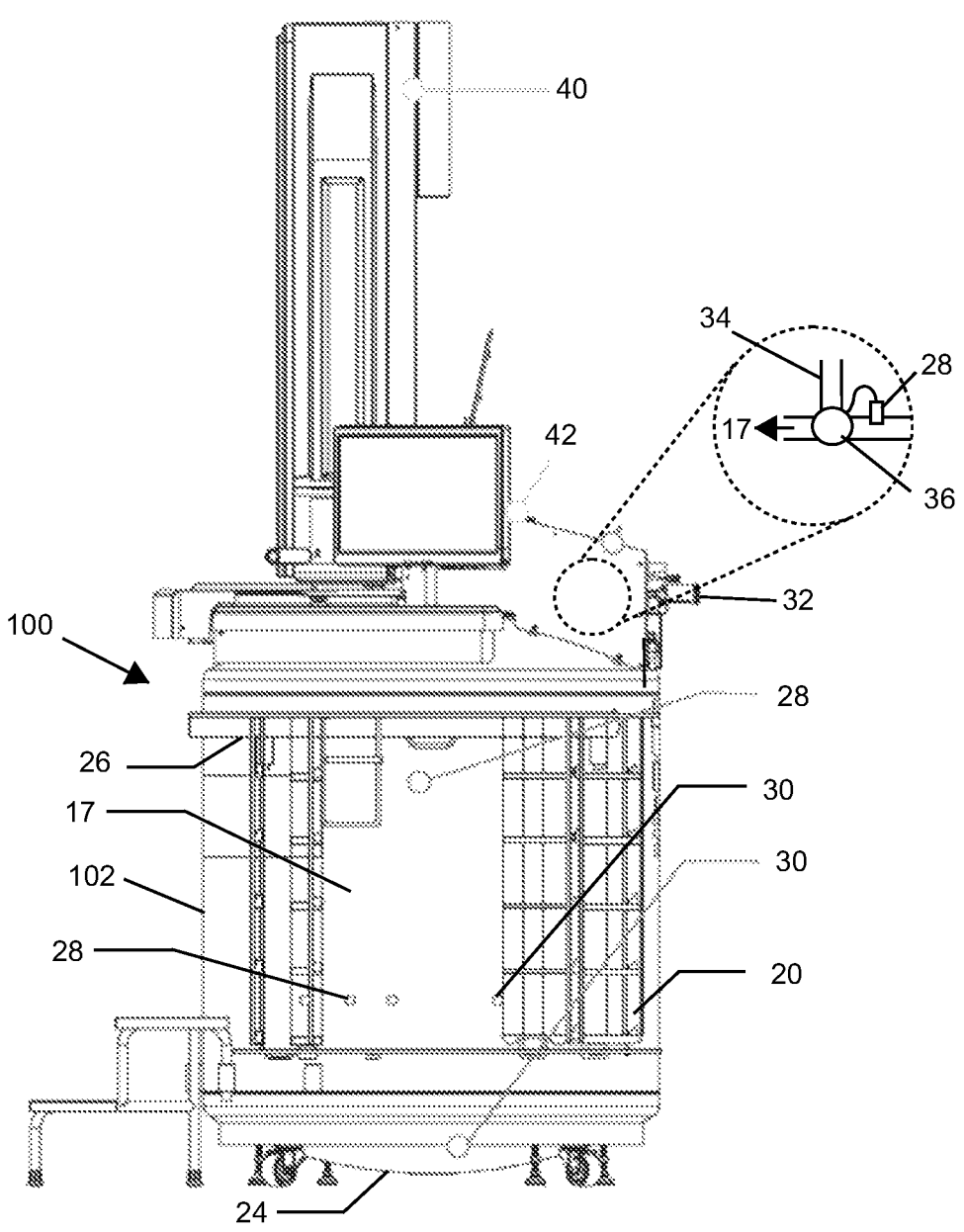
FIG. 5 is a side elevation view of a cryogenic storage system, according to at least one implementation, the cryogenic storage system including or interfacing with at least one sensor to measure at least one parameter with a temperature controlled environment of the cryogenic storage system.
Figure 6:
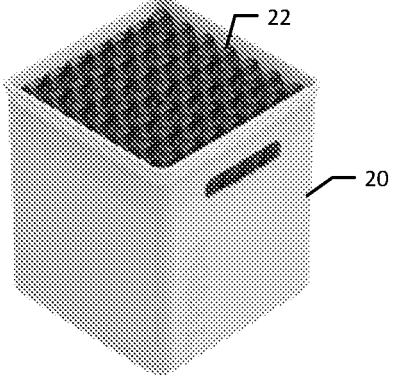
FIG. 6 is an isometric view of a storage cassette holding a plurality of specimen containers, according to at least one implementation.
Figure 7:
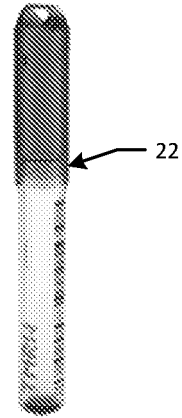
FIG. 7 is side view of one of the specimen containers illustrated in FIG. 6.

Referring to FIGS. 5 to 7, the cryogenic storage system 100 at least partially encloses a temperature controlled environment 17, for example formed at least partially by the cryogenic storage tank or freezer 102. The cryogenic storage tank or freezer 102 is sized to store a number of storage cassettes 20, each carrying a number of specimen containers 22, within the temperature controlled environment 17 such that biological specimen contained within each of the specimen containers 22 are maintained at or below a threshold temperature.

According to one embodiment, the storage cassettes 20 may be similar to the storage cassettes 202 (shown in FIG. 2) or the carrier cassettes 302 (shown in FIG. 3) such that the disclosures of each apply to the storage cassettes 20. Similarly, according to one embodiment, the specimen container 22 may be similar to the specimen container 200 (shown in FIG. 2) such that the disclosure of the specimen container 200 applies to the specimen container 22.

The cryogenic storage tank may include a bottom surface 24 and a top surface 26 that each form a portion of a boundary for the temperature controlled environment 17. As shown, the top surface 26 may face the bottom surface and be spaced from the bottom surface 24 so as to define a height of the temperature controlled environment 17. The top surface 26 may include the opening 116 (as shown in FIG. 1) that provides passage into and egress out of the temperature controlled environment 17 for the storage cassettes 20.

The cryogenic storage system 100 may include at least one temperature sensor 28 positioned so as to measure a temperature within the temperature controlled environment 17. According to one embodiment the at least one temperature sensor 28 may be positioned within the temperature controlled environment 17, for example carried by the cryogenic storage tank or freezer 102. According to one embodiment the at least one temperature sensor 28 is closer to the top surface 26 (or the opening 116) than the at least one temperature sensor 28 is from the bottom surface 24.

Such placement may be beneficial as the top of the temperature controlled environment 17 may be more susceptible to a rise in temperature. This susceptibility may be due to the proximity of the opening 116 near the top of the temperature controlled environment 17, as well as the tendency for cryogenic medium to sink towards the bottom of the temperature controlled environment 17 in addition to other factors.

One or more of the at least one temperature sensor 28 may be positioned so as to measure a temperature in a first region (a subset) of the temperature controlled environment 17. Another of the at least one temperature sensor 28 may be positioned so as to measure a temperature in a second region of the temperature controlled environment 17. The first region may be relatively higher (above) the second region. One or more of the regions within the temperature controlled environment 17 may include a plurality of the at least one temperature sensor 28, such that a backup or redundant sensor is present in the event of a failure of the other at least one temperature sensor 28 in the same region.

A plurality of the at least one temperature sensor 28 may be positioned equidistant from the top surface 26, for example such that each of the plurality of the at least one temperature sensor 28 are at the same height. A plurality of the at least one temperature sensor 28 may be radially spaced about a central axis of the cryogenic storage tank or freezer 102, for example such that the plurality of the at least one temperature sensors 28 are equidistant from one another.

According to one embodiment, the at least one temperature sensor 28 may include a subset of temperature sensors 28 that are positioned closer to the bottom surface 24 than the subset of temperature sensors 28 is from the top surface 26. Accurate temperature readings at various positions within the temperature controlled environment 17 may ensure a consistent temperature throughout the temperature controlled environment 17 and may assist in identification of a localized problem, for example a leak, within the cryogenic storage tank or freezer 102.

The cryogenic storage system 100 may include at least one level sensor 30 positioned so as to measure an amount of cryogenic medium inside the cryogenic storage tank or freezer 102. According to one embodiment, the at least one level sensor 30 may be positioned within the temperature controlled environment 17, for example carried by the cryogenic storage tank or freezer 102 such that the at least one level sensor 30 is closer to the bottom surface 24 than the at least one level sensor 30 is from the top surface 26. According to one embodiment, the at least one level sensor 30 includes a pressure sensor positioned at the lowest point within the temperature controlled environment 17, for example on the bottom surface 24 of the cryogenic storage tank or freezer 102, such that the pressure sensor measures the mass of the cryogenic medium inside the cryogenic storage tank or freezer 102.

According to one embodiment, the at least one level sensor 30 may be positioned within the temperature controlled environment 17, for example carried by the cryogenic storage tank or freezer 102 such that the at least one level sensor 30 is closer to the top surface 26 than the at least one level sensor 30 is from the bottom surface 24. The at least one level sensor 30 may include a float valve type structure, for example with the sensor itself positioned outside the temperature controlled environment 17 while a float and part of arm extend into the temperature controlled environment 17.

According to one embodiment, the at least one level sensor 30 may be an optical sensor, which shoots a beam (for example, an infrared beam) across a width of the temperature controlled environment 17, or shoots the beam longitudinally (vertically) and measures time of flight for return of reflection off a top surface of the cryogenic medium (for example, liquid nitrogen), or includes a transmitter at one location (for example, proximate the top of the temperature controlled environment 17) and a receiver opposed (for example, proximate the bottom of the temperature controlled environment 17) and measures time to transmit or attenuation or phase shift to determine the amount of cryogenic medium within the temperature controlled environment 17.

According to one embodiment, the at least one level sensor 30 may include a fill sensor that detects the presence of cryogenic medium when the fill sensor is submerged in the cryogenic medium. As the level of the cryogenic medium drops such that the fill sensor is no longer submerged in the cryogenic medium, the fill sensor detects this change in status. The at least one level sensor 30 may include: one or more fill sensors positioned closer to the bottom surface 24 than the one or more fill sensors are from the top surface 26, one or more fill sensors positioned closer to the top surface 26 than the one or more fill sensor are from the bottom surface 24, or a combination of fill sensors some of which are positioned closer to the top surface 26 and others of which are positioned closer to the bottom surface 24.

The cryogenic storage system 100 may include a port 32 that provides passage of cryogenic medium into the temperature controlled environment 17 along a path remote from the opening 116. The port 32 may include another of the at least one temperature sensor 28 positioned to measure temperature of a medium passing through the port 32. The port 32 may be coupled to a bypass 34 such that: 1) upon the temperature sensor 28 of the port 32 measuring a temperature of a medium passing through the port 32 within a permitted temperature range, the bypass 34 is closed and the path to the temperature controlled environment 17 is open; and 2) upon the temperature sensor 28 of the port 32 measuring a temperature of the medium passing through the port 32 outside of a permitted temperature range the bypass 34 is open and the path to the temperature controlled environment 17 is blocked.

Opening and closing of the bypass 34 and the path may be implemented by a valve 36. According to one embodiment, the valve 36 may be actuated in response to a signal sent from the temperature sensor 28 of the port 32. For example, if a supply of cryogenic medium, for example liquid nitrogen, is connected to the port 32 such that the liquid nitrogen flows through the port 32, the temperature sensor 28 of the port 32 will detect that the temperature of the cryogenic medium is within the permitted temperature range and the valve 36 will be oriented such that the bypass 34 is blocked and the path to the temperature controlled environment 17 is open. If, on the other hand, a supply of a non-cryogenic medium is connected to the port 32, the temperature sensor 28 of the port 32 will detect that the temperature of the medium is outside the permitted temperature range and the valve 36 will be oriented such that the bypass 34 is open and the path to the temperature controlled environment 17 is blocked, thus preventing the temperature controlled environment 17 from being negatively impacted.

According to one embodiment, the at least one level sensor 30 may be communicatively coupled to the port 32 such that upon the at least one level sensor 30 measuring the amount of cryogenic medium inside the cryogenic storage tank or freezer 102 as being below a first threshold, the port 32 opens thereby allowing an additional amount of the cryogenic medium to enter the cryogenic storage tank or freezer 102. The at least one level sensor 30 may be communicatively coupled to the port 32 such that upon the at least one level sensor 30 measuring the amount of cryogenic medium inside the cryogenic storage tank or freezer 102 as being above a second threshold, the port 32 closes thereby preventing any additional amount of the cryogenic medium from entering the cryogenic storage tank or freezer 102.

The cryogenic storage system 100 may include a processor-based control system including at least one processor and at least one nontransitory memory communicatively coupled to the at least one processor and storing processor-executable instructions, for example as described below. The at least one temperature sensor 28 may be coupled to the at least one processor such that the at least one temperature sensor 28 is operable to provide a signal representative of a temperature in the temperature controlled environment 17 to the at least one processor. Similarly, the at least one level sensor 30 may be coupled to the at least one processor such that the at least one level sensor 30 is operable to provide a signal representative of the amount of cryogenic medium inside the cryogenic storage tank to the at least one processor.

The cryogenic storage system 100 may include at least one user interface system communicatively coupled to the at least one processor such that the at least one processor executes processor-executable instructions to present a user interface. The at least one user interface system may include one or more display screens, one or more touch-sensitive display screens, one or more speakers, one or more microphones, one or more keyboards, one or more pointer devices, one or more haptic interfaces, or any combination thereof.

According to one embodiment, the at least one processor is operable to execute the processor-executable instructions, which cause the at least one processor to perform at least one of: receiving the signal representative of the temperature over a period of time to form a time domain representation of the temperature in the temperature controlled environment 17; and receiving the signal representative of the level of the cryogenic fluid in the cryogenic storage tank or freezer 102 over the period of time to form a time domain representation of the level of the cryogenic fluid in the cryogenic storage tank or freezer 102. The at least one processor may be further operable to execute the processor-executable instructions, which cause the at least one processor to perform outputting one or more status indications to the at least one user interface system, the one or more status indications based at least in part on the time domain representation of the temperature, the time domain representation of the level, or both.

According to one embodiment, the one or more status indications may include an estimated amount of time remaining before the temperature in the temperature controlled environment 17 crosses a threshold value. The threshold value may be a maximum temperature at which a specimen within the specimen containers 22 remains cryo-stable, or may be based on the maximum temperature at which a specimen within the specimen containers 22 remains cryo-stable with a factor of safety built in, for example negative 175 degrees Celsius.

The processor-based control system may help predict future maintenance for the cryogenic storage system 100, such maintenance including refilling of cryogenic medium and repair/replacement of components prior to failure. Thus, the one or more status indications may include an estimated amount of time remaining before the level of the cryogenic fluid in the cryogenic storage tank or freezer 102 crosses a second threshold value. According to one embodiment, the one or more status indications may include a predicted amount of time until equipment failure.

The at least one processor may be operable to execute processor-executable instructions that cause the at least one processor to perform outputting an alert to a first recipient of a set of recipients based at least in part on the time domain representation of the temperature, the time domain representation of the level, or both. The at least one processor may be further operable to execute processor-executable instructions that cause the at least one processor to perform outputting of the alert to a second recipient of the set of recipients if an acknowledgement is not received within a first defined time period from the first recipient.

The at least one processor may be further operable to execute processor-executable instructions that cause the at least one processor to perform outputting of the alert to a third recipient if the acknowledgement is not received within a second defined time period from either the first recipient or the second recipient, the third recipient excluded from the set of recipients. The third recipient may be an administer, manager, or other individual that represents an escalation beyond the original set of recipients.

The at least one processor may be operable to execute processor-executable instructions that cause the at least one processor to perform initiating a reordering process of the cryogenic medium when a value representative of the amount of the cryogenic medium inside the cryogenic storage tank or freezer 102, or a value representative of a predicted amount of the cryogenic medium in the cryogenic storage tank or freezer 102 at a future time, falls below a defined threshold. The at least one processor may be operable to execute processor-executable instructions that cause the at least one processor to perform initiating a backup system to increase the amount of the cryogenic fluid in the cryogenic storage tank or freezer 102 when a value representative of the amount of the cryogenic fluid in the cryogenic storage tank or freezer 102, or a value representative of a predicted amount of the cryogenic fluid in the cryogenic storage tank at a future time, falls below a defined threshold.

The at least one processor may be operable to execute processor-executable instructions that cause the at least one processor to perform detection of intrusions to the cryogenic storage system, for example by an unauthorized user. According to one embodiment, a temperature measurement by one of the at least one temperature sensors 28 at a respective location in the temperature controlled environment 17 may be associated with one or more of the specimen containers 22 nearest the respective location.

According to one embodiment, the at least one processor may logically associate in a nontransitory processor-readable medium, the temperature of the specimen container 22 with the specimen container 22. This association may include storing temperatures of the specimen container 22 at each time period during a range of time periods, or simply setting a flag or other indicator that indicates whether a threshold temperature of the specimen container 22 was exceeded at any time during the time period, whether a threshold temperature was exceeded for a first defined duration at any time during the time period, or whether a threshold temperature was exceeded for a cumulative of two or more distinct durations during the time period. The data related to the association may be stored in a data store that stores information for the specimen containers 22 associated with two, three, or more different subjects or patients. According to one embodiment the at least one processor may store temperature data in memory that is physically associated with the respective specimen container 22, for example, stored in a read/writable memory of a wireless (for example, RFID) transponder physically coupled to or physically incorporated into a portion (for example, the vial, the cap, or the straw) of the specimen container 22.

The cryogenic storage system 100 may include one or more position sensors 40 that identify the current position of the robot used to retrieve the storage cassettes 20. The cryogenic storage system 100 may include an uninterrupted power supply 42, such that an unexpected loss of power during a storage/retrieval event will not prevent completion of the storage/retrieval event including maintaining the chain-of-custody of the specimen containers 22 involved in the storage/retrieval event.

Figure 8:
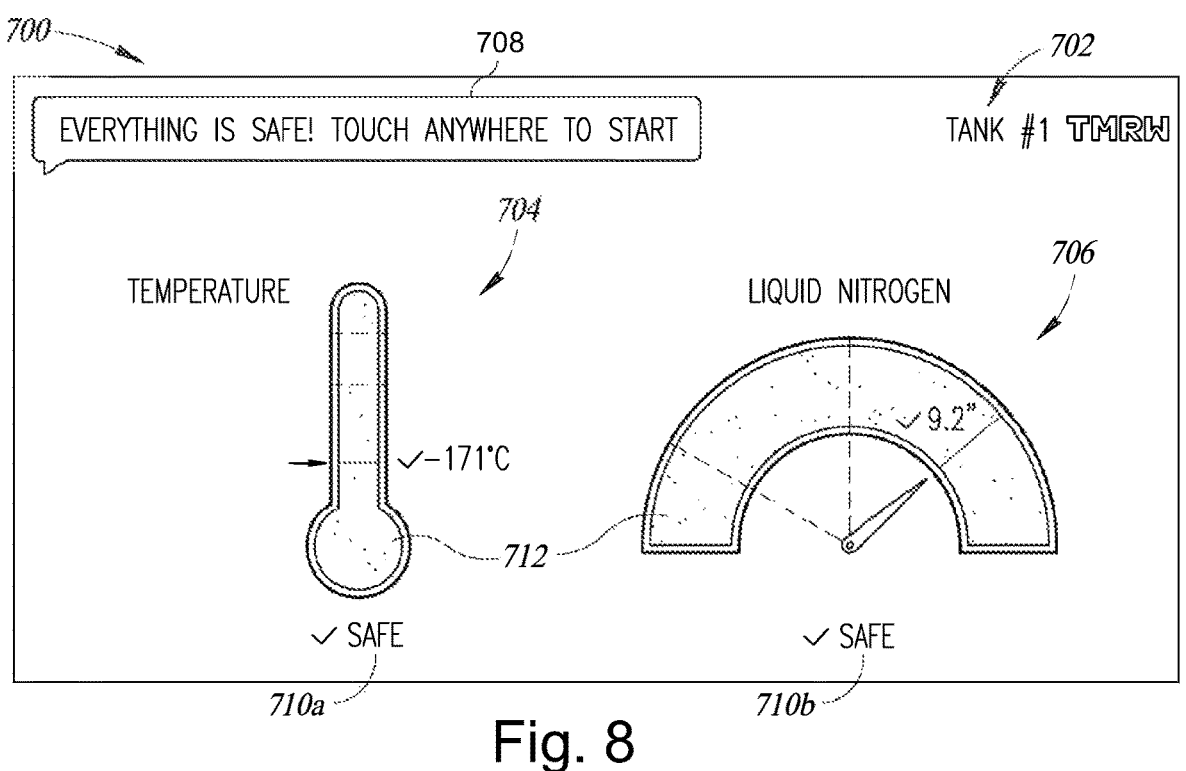
FIG. 8 is a screen print showing a tank status window of a user interface at a first time, according to at least one implementation.
Figure 9:
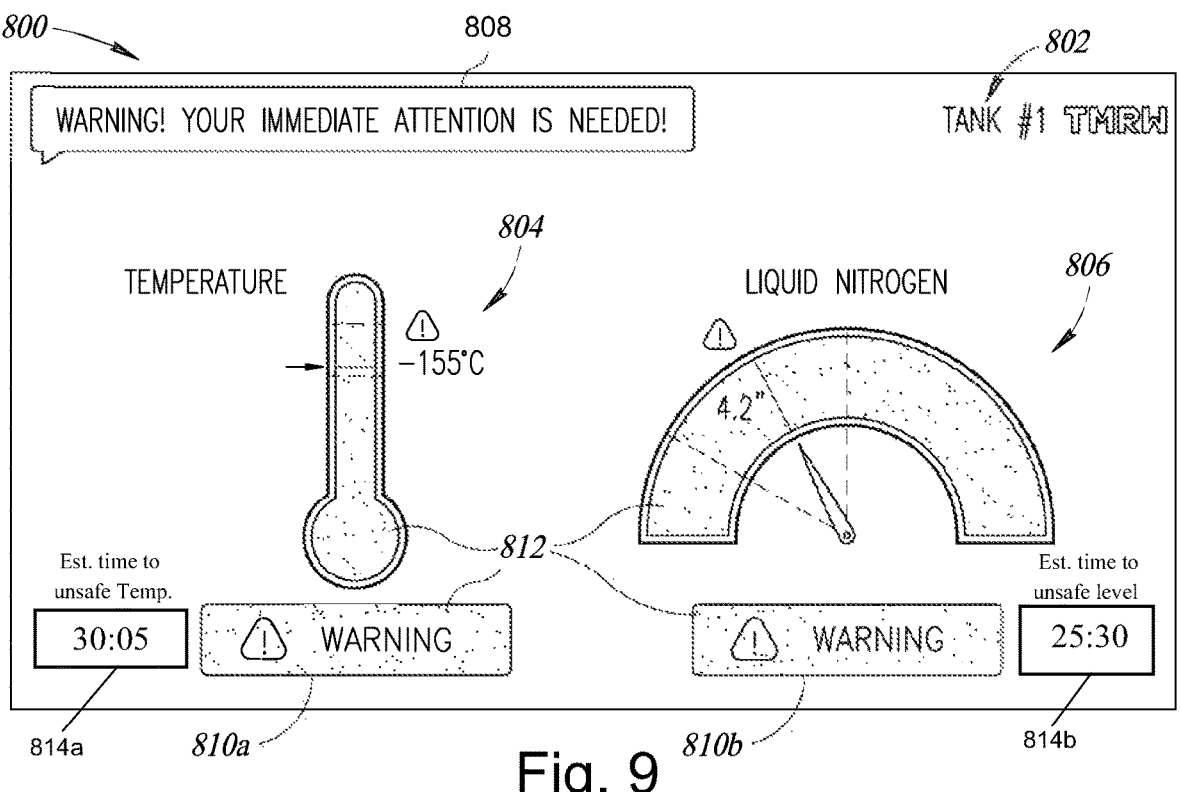
FIG. 9 is a screen print showing a tank status window of a user interface at a second time, according to at least one implementation.
Figure 10:
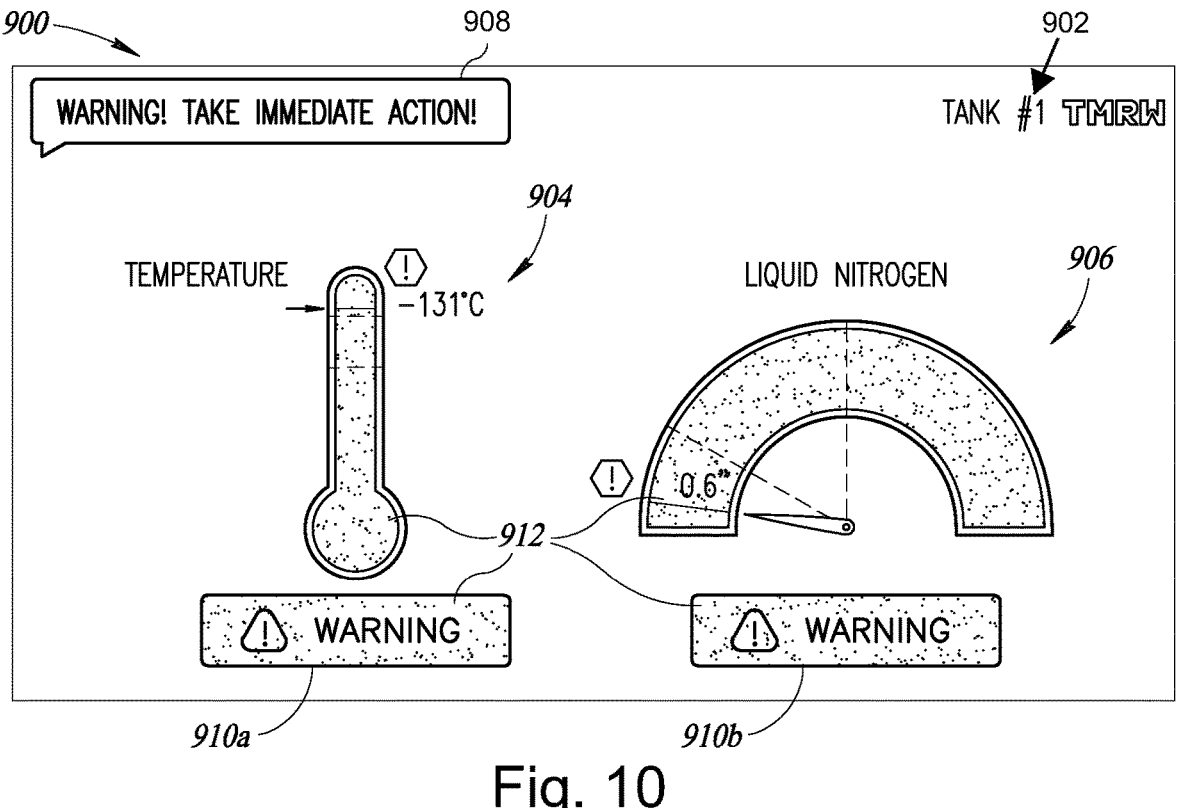
FIG. 10 is a screen print showing a tank status window of a user interface at a third time, according to at least one implementation.

FIGS. 8 through 10 show an exemplary user interface to facilitate operation of the process-based transfer system 122. Such can be thought of as a backend system, operable to store, retrieve and inventory specimens retained on specimen holders or "cryodevices" which are in turn stored in specimen containers marked with wireless transponders and/or machine-readable symbols. These specimen containers may hold one or multiple sample holders, and are generally logically associated with a particular patient. The specimen containers are transferable between storage cassettes for storage in a cryogenic refrigerator and carrier cassettes for storage in a portable thermally insulated carrier used, for instance, to transport the specimens to and from a patient.

FIG. 8 shows a tank status window 700 of a user interface for a cryogenic robot system at a first time, the tank status window 700 providing a status of a cryogenic tank (for example the cryogenic storage tank or freezer 102), according to at least one illustrated implementation. The at least one processor of the cryogenic storage system 100 may cause presentation of the tank status window 700 via a display monitor, heads up display, or other user interface device based on signals sent by the at least one temperature sensor 28, the at least one level sensor 30, or both.

The tank status window 700 may include a tank identification 702, a temperature indicator 704 of a liquid nitrogen bath, a level indicator 706 of the liquid nitrogen bath, or any combination thereof. The tank identification 702 may be located within a panel of the tank status window 700 that includes the temperature indicator 704 and the level indicator 706 as shown. According to one embodiment, the tank identification 702 may be located in a separate panel of the tank status window 700, for example such that the tank identification is positioned below the temperature indicator 704 and the level indicator 706. The tank status window 700 may provide one or more indicators that both the temperature and level are within acceptable conditions, for example via a message (for example, "Everything is safe") 708, a graphical indicator (for example, checkmark with the word "safe") 710a, 710b, a color (for example, green) 712, or any combination thereof.

The tank status window 700 may, for example, be presented as a default window, for instance as a "screensaver" window when not otherwise interacting with the user interface. Additionally, or alternatively, the tank status window 700 may be presented at other times, for example in response to performing an initialization or a status check. The tank status window 700 may, for example, be presented continuously, or as an alert in response to occurrence of certain conditions (for example, temperature above one or more defined thresholds, fluid below one or more defined thresholds). Additionally, one or more alerts may be issued, for example via text message, electronic mail, etc.

FIG. 9 shows the tank status window 800, which is similar to the tank status window 700 of FIG. 8, of a user interface for a cryogenic robot system at another time, the tank status window 800 providing a status of a cryogenic tank (for example the cryogenic storage tank or freezer 102), according to at least one illustrated implementation. The processor-based transfer system 122 of the cryogenic system 100 causes presentation of the tank status window 800 via a display monitor, heads up display, or other user interface device.

The tank status window 800 includes a tank identification 802, a temperature indicator 804 of a liquid nitrogen bath, a level indicator 806 of the liquid nitrogen bath, or any combination thereof. The tank identification 802 may be located within a panel of the tank status window 800 that includes the temperature indicator 804 and the level indicator 806 as shown. According to one embodiment, the tank identification 802 may be located in a separate panel of the tank status window 800, for example such that the tank identification is positioned below the temperature indicator 804 and the level indicator 806.

The tank status window 800 may provide one or more indicators that both the temperature and level are approaching or at marginal conditions, for example via a message (for example, "WARNING! Your immediate attention is needed") 808, a graphical indicator (for example, exclamation symbol and the word Warning) 810a, 810b, a color (for example, yellow) 812, or any combination thereof. In particular, the tank status window 800 of FIG. 8 provides a first level of warning regarding conditions in the cryogenic tank or bath deteriorating (for example, temperature approaching or at a first temperature threshold or level of fluid approaching or at a first fluid level threshold). According to one embodiment, the tank status window 800 may indicate a critical condition.

The at least one processor of the cryogenic storage system 100 may cause presentation of the tank status window 800 via a display monitor, heads up display, or other user interface device based on signals sent by the at least one temperature sensor 28, the at least one level sensor 30, or both. According to one embodiment, the tank status window 800 includes information that indicates an action needed to prevent a potential future problem. For example, the at least one level sensor 30 may determine that the amount of cryogenic medium in the temperature controlled environment 17 is dropping and that a refill will be needed within a certain amount of time to prevent an unsafe rise in temperature.

The tank status window 800 may, for example, be presented as a default window, for instance as a "screensaver" window when not otherwise interacting with the user interface. The tank status window 800 may, for example, be presented continuously, or as an alert in response to occurrence of certain conditions (for example, temperature above one or more defined thresholds, fluid below one or more defined thresholds). Additionally, one or more alerts may be issued, for example via text message, electronic mail, etc.

FIG. 10 shows the tank status window 900 of the user interface for a cryogenic robot system at yet another time, the tank status window 900 providing a status of a cryogenic tank (for example the cryogenic storage tank or freezer 102), according to at least one illustrated implementation. The processor-based transfer system 122 of the cryogenic system 100 causes presentation of the tank status window 900 via a display monitor, heads up display, or other user interface device. The tank status window 900 may include a tank identification 902, for example a specific one of the cryogenic storage tank or freezer 102, being monitored, a temperature indicator 904 of liquid nitrogen within the tank 902, a level indicator 906 of the liquid nitrogen within the tank 902, or combination thereof. The tank identification 902 may be located within a panel of the tank status window 900 that includes the temperature indicator 904 and the level indicator 906 as shown. According to one embodiment, the tank identification 902 may be located in a separate panel of the tank status window 900, for example such that the tank identification is positioned below the temperature indicator 904 and the level indicator 906.

The tank status window 900 may provide one or more indicators that both the temperature and level are at or below acceptable conditions, for example via a message (for example, "WARNING! TAKE IMMEDIATE ACTION!") 908, a graphical indicator (for example, exclamation symbol and the word Warning) 910*a*, 910*b*, a color (for example, red) 912, or any combination thereof. In particular, the tank status window 900 of FIG. 10 provides a second level of warning, more dire than the first level of warning, regarding conditions in the cryogenic tank or bath deteriorating (for example, temperature approaching or at a second temperature threshold or level of fluid approaching or at a second fluid level threshold). According to one embodiment, the tank status window 900 may indicate a failure condition.

As shown, the one or more indications may include an estimated amount of time remaining 814*a* before the temperature in the temperature controlled environment 17 crosses a threshold value. The threshold value may be a maximum temperature at which a specimen within the specimen containers 22 remains cryo-stable, or may be based on the maximum temperature at which a specimen within the specimen containers 22 remains cryo-stable with a factor of safety built in, for example negative 175 degrees Celsius. The estimated amount of time remaining 814*a* before the temperature in the temperature controlled environment 17 crosses a threshold value may be based on the history of the temperature within the cryogenic storage tank or freezer 102, for example how fast the temperature is increasing or how long the temperature has been increasing.

As shown, the one or more indications may include an estimated amount of time remaining 814*b* before the amount of cryogenic medium (for example liquid nitrogen) in the temperature controlled environment 17 crosses a threshold value. The threshold value may be a minimum amount at which all of the biological samples within the specimen containers 22 remain submerged in the cryogenic medium. The estimated amount of time remaining 814*b* before the amount of cryogenic medium in the temperature controlled environment 17 crosses the threshold value may be based on the history of the amount of cryogenic medium within the cryogenic storage tank or freezer 102, for example how fast the amount is decreasing or for how long the amount has been decreasing.

The at least one processor of the cryogenic storage system 100 may cause presentation of the tank status window 900 via a display monitor, heads up display, or other user interface device based on signals sent by the at least one temperature sensor 28, the at least one level sensor 30, or both. According to one embodiment, the tank status window 900 includes information that indicates an action needed to prevent a potential future problem. For example, the at least one level sensor 30 may determine that the amount of cryogenic medium in the temperature controlled environment 17 is dropping and that a refill will be needed within a certain amount of time to prevent an unsafe rise in temperature.

The tank status window 900 may, for example, be presented as a default window, for instance as a "screensaver" window when not otherwise interacting with the user interface. The tank status window 900 may, for example, be presented continuously, or as an alert in response to occurrence of certain conditions (for example, temperature above one or more defined thresholds, fluid below one or more defined thresholds). Additionally, one or more alerts may be issued, for example via text message, electronic mail, etc.

The estimated amount of time remaining 814*a* and 814*b* may be present at all times (for example in each of tank status windows 700, 800, and 900), according to one embodiment. Alternatively, the estimated amount of time remaining 814*a* and 814*b* may be present only at certain times, for example when the value for the estimated time crosses a certain threshold.

The various implementations and embodiments described above can be combined to provide further implementations and embodiments. All of the commonly assigned U.S. patent application publications, U.S. patent applications, foreign patents, and foreign patent applications referred to in this specification and/or listed in the Application Data Sheet, including but not limited to U.S. patent application Ser. No. 17/083,179, filed Oct. 28, 2020; U.S. patent application 63/082,640, filed Sep. 24, 2020; U.S. patent application 63/026,526, filed May 18, 2020; U.S. patent application Ser. No. 16/842,034, filed Apr. 7, 2020; U.S. patent application Ser. No. 16/842,030, filed Apr. 7, 2020; U.S. patent application Ser. No. 16/840,720, filed Apr. 6, 2020; U.S. patent application Ser. No. 16/840,718, filed Apr. 6, 2020; U.S. patent application 62/936,133, filed Nov. 15, 2019; U.S. patent application 62/927,566, filed Oct. 29, 2019; U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018, are each incorporated herein by reference, in their entirety. These and other changes can be made to the embodiments in light of the above-detailed description.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A cryogenic storage system to store specimen containers in a temperature controlled environment, the system comprising:

a cryogenic storage tank comprising at least one wall that forms an interior cryogenic storage tank and that thermally insulates the interior of the cryogenic storage tank from an exterior thereof to provide the temperature controlled environment, the cryogenic storage tank including an opening that provides ingress into and egress out of the temperature controlled environment;

a first temperature sensor positioned to sense a temperature in the temperature controlled environment in the interior of the cryogenic storage tank;

a second temperature sensor positioned to sense a temperature in the temperature controlled environment in the interior of the cryogenic storage tank, wherein the second temperature sensor is positioned below the first temperature sensor;

a port that provides passage for cryogenic medium into the temperature controlled environment in the interior of the cryogenic storage tank along a fluid path separate from the opening;

a control system communicatively coupled to the first temperature sensor and the second temperature sensor, and operably coupled to the port, the control system operable to i) in response to the temperature sensed by the second temperature sensor increasing above a first threshold, permitting passage of the cryogenic medium into the temperature controlled environment via the port; and ii) in response to the temperature sensed by the first temperature sensor decreasing below a second threshold, preventing passage of the cryogenic medium into the temperature controlled environment via the port.

2. The cryogenic storage system of claim 1 further comprising:

a third temperature sensor positioned to sense temperature in the temperature controlled environment in the interior of the cryogenic storage tank, wherein the third temperature sensor is positioned below the second temperature sensor, wherein the control system is communicatively coupled to the third temperature sensor, and the control system is operable to output an alert in response to the temperature sensed by the third temperature sensor increasing above the first threshold.

3. The cryogenic storage system of claim 2 wherein the alert is a first alert output to a first recipient, and the control system is operable to output a second alert to a second recipient after a threshold amount of time passes during which the control system receives no response from the first recipient.

4. The cryogenic storage system of claim 3 wherein the control system is operable to output a third alert to a third recipient after a threshold amount of time passes during which the control system receives no response from either the first recipient or the second recipient.

5. The cryogenic storage system of claim 3 wherein the first alert and the second alert include the same information, and the first recipient and the second recipient are different entities.

6. The cryogenic storage system of claim 1 further comprising:

a third temperature sensor positioned to sense temperature in the temperature controlled environment in the interior of the cryogenic storage tank, wherein the third temperature sensor is positioned above the first temperature sensor, wherein the control system is communicatively coupled to the third temperature sensor, and the control system is operable to output an alert in response to the temperature sensed by the third temperature sensor decreasing below the second threshold.

7. The cryogenic storage system of claim 1, further comprising:

a pressure sensor positioned within the temperature controlled environment to sense a pressure in the temperature controlled environment.

8. The cryogenic storage system of claim 1 wherein the port includes a valve, the control system is operably coupled to the valve so as to open the valve when permitting passage of the cryogenic medium into the temperature controlled environment, and the control system is operably coupled to the valve so as to close the valve when preventing passage of the cryogenic medium into the temperature controlled environment.

9. The cryogenic storage system of claim 1 wherein:

the control system includes at least one processor and at least one nontransitory medium communicatively coupled to the at least one processor, the at least one nontransitory medium stores processor-executable instructions executable by the at least one processor, and the first temperature sensor and the second temperature sensor are each communicatively coupled to the at least one processor to provide a signal representative of the sensed temperatures in the temperature controlled environment to the at least one processor.

10. The cryogenic storage system of claim 9, further comprising:

at least one user interface system to which the at least one processor is communicatively coupled so as to cause the at least one user interface system to present a user interface, wherein the at least one processor receives the signal representative of the temperature over a period of time to form a time domain representation of the temperature in the temperature controlled environment, and wherein, execution of the processor-executable instructions by the at least one processor, causes the at least one processor to cause the at least one user interface system to output one or more status indications, the one or more status indications based at least in part on the time domain representation of the temperature.

11. A method of operating a cryogenic storage system, the method comprising:

sensing a temperature in a temperature controlled environment of a cryogenic storage tank with a first temperature sensor positioned within the temperature controlled environment;

sensing a temperature in the temperature controlled environment with a second temperature sensor positioned within the temperature controlled environment at a location below the first temperature sensor;

detecting the temperature sensed by the second temperature sensor rising above a first threshold by a control system communicatively coupled to the second temperature sensor;

in response to the control system detecting the temperature sensed by the second temperature sensor rising above the first threshold, opening passage through a port of the cryogenic storage tank via the control system, which is operably coupled to the port;

increasing an amount of cryogenic medium within the temperature controlled environment while passage through the port is open;

detecting the temperature sensed by the first temperature sensor dropping below a second threshold by the control system, which is communicatively coupled to the first temperature sensor;

in response to the control system detecting the temperature sensed by the first temperature sensor dropping below the second threshold, closing passage through the port via the control system, wherein closing passage through the port blocks additional cryogenic medium from entering the temperature controlled environment via the port.

12. The method of claim 11, further comprising:

sensing a temperature in the temperature controlled environment with a third temperature sensor positioned within the temperature controlled environment and below the second temperature sensor;

generating an alert message via the control system in response to the temperature sensed by the third temperature sensor increasing above the first threshold; and sending the alert message to one or more recipients.

13. The method of claim 12, further comprising:

after passage of an amount of time during which the control system receives no response from any of the one or more recipients, sending the alert message to at least one additional recipient, wherein the at least one additional recipient is excluded from the one or more recipients.

14. The method of claim 11, further comprising:

sensing a temperature in the temperature controlled environment with a third temperature sensor positioned within the temperature controlled environment and above the first temperature sensor;

generating an alert message via the control system in response to the temperature sensed by the third temperature sensor decreasing below the second threshold; and sending the alert message to one or more recipients.

15. The method of claim 14, further comprising:

after passage of an amount of time during which the control system receives no response from any of the one or more recipients, sending the alert message to at least one additional recipient, wherein the at least one additional recipient is excluded from the one or more recipients.

16. The method of claim 11, further comprising:

actuating a valve via the control system, thereby opening passage through the port.

17. The method of claim 16, further comprising:

actuating the valve via the control system, thereby closing passage through the port.

18. A method of operating a cryogenic storage system, the method comprising:

sensing a temperature in a temperature controlled environment of a cryogenic storage tank with a first temperature sensor positioned within the temperature controlled environment;

sensing a temperature in the temperature controlled environment with a second temperature sensor positioned within the temperature controlled environment at a location below the first temperature sensor;

generating an output that includes both the temperature sensed by the first temperature sensor and the temperature sensed by the second temperature sensor, the output further including an estimated amount of time remaining before the temperature sensed by the second temperature sensor increases above a threshold temperature; and sending the output to at least one user interface; and displaying the temperature sensed by the first temperature sensor, the temperature sensed by the second temperature sensor; and the estimated amount of time remaining before the temperature sensed by the second temperature sensor increases above the threshold temperature with the at least one user interface.

19. The method of claim 18 wherein the threshold temperature is a first threshold temperature, further comprising:

detecting the temperature sensed by the second temperature sensor rising above the first threshold by a control system communicatively coupled to the second temperature sensor;

in response to the control system detecting the temperature sensed by the second temperature sensor rising above the first threshold, opening passage through a port of the cryogenic storage tank via the control system, which is operably coupled to the port;

increasing an amount of cryogenic medium within the temperature controlled environment while passage through the port is open;

detecting the temperature sensed by the first temperature sensor dropping below a second threshold by the control system, which is communicatively coupled to the first temperature sensor;

in response to the control system detecting the temperature sensed by the first temperature sensor dropping below the second threshold, closing passage through the port via the control system, wherein closing passage through the port blocks additional cryogenic medium from entering the temperature controlled environment via the port.

20. The method of claim 18, further comprising:

generating an alert message in response to the temperature sensed by the second temperature sensor increasing above the first threshold; and sending the alert message to one or more recipients.

* * * * *